United States Patent
Glistvain

(10) Patent No.: US 10,977,014 B2
(45) Date of Patent: *Apr. 13, 2021

(54) WEB-BASED PROGRAMMING ENVIRONMENT FOR EMBEDDED DEVICES

(71) Applicant: Turck Holding GmbH, Halver (DE)

(72) Inventor: Roman Glistvain, Plymoutn, MN (US)

(73) Assignee: Turck Holding, GmbH, Halver (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,842

(22) Filed: May 15, 2019

(65) Prior Publication Data

US 2019/0266066 A1 Aug. 29, 2019

Related U.S. Application Data

(63) Continuation of application No. 15/245,923, filed on Aug. 24, 2016, now Pat. No. 10,318,404.

(Continued)

(51) Int. Cl.
*G06F 8/38* (2018.01)
*G06F 11/36* (2006.01)
(Continued)

(52) U.S. Cl.
CPC .................. *G06F 8/38* (2013.01); *G06F 8/34* (2013.01); *G06F 11/362* (2013.01); *G06F 11/3664* (2013.01); *G06F 8/30* (2013.01); *G06F 8/60* (2013.01); *G06F 8/71* (2013.01); *G06F 9/455* (2013.01)

(58) Field of Classification Search
CPC ...... G06F 8/38; G06F 11/362; G06F 11/3664; G06F 8/34; G06F 8/30; G06F 8/60; G06F 8/71; G06F 9/455
See application file for complete search history.

(56) References Cited

U.S. PATENT DOCUMENTS

| 4,991,076 A | * | 2/1991 | Zifferer | ................ | G05B 19/058 700/18 |
| 5,127,099 A | * | 6/1992 | Zifferer | ................ | G05B 19/058 340/5.22 |

(Continued)

*Primary Examiner* — Matthew J Brophy
(74) *Attorney, Agent, or Firm* — Robert C. Freed; Dykema Gossett PLLC

(57) ABSTRACT

A programming environment and a simple programming language that runs on Ethernet block-input/output (block-IO) devices and hosting servers. In some embodiments, the ARGEE™ system includes a web-based programming environment that compiles a GUI program into a bytecode program of a virtual machine; and the virtual machine that runs in the device firmware and executes the bytecode program representing the GUI program created by a user. There are many programming languages that provide a web-based programming environment. Some such languages apply to embedded devices. However, the ARGEE™ system, considered as a whole, is unique in that the programming environment is not hosted on the same embedded device it controls. The system reduces the FLASH-memory requirements of the device by hosting the environment on an external server. The system also facilitates a faster update cycle of the environment software, making it easier to distribute changes to customers when environment changes.

26 Claims, 8 Drawing Sheets

Related U.S. Application Data

(60) Provisional application No. 62/211,490, filed on Aug. 28, 2015.

(51) Int. Cl.
*G06F 8/34* (2018.01)
*G06F 8/30* (2018.01)
G06F 8/60 (2018.01)
G06F 8/71 (2018.01)
G06F 9/455 (2018.01)

(56) References Cited

U.S. PATENT DOCUMENTS

| | | | |
|---|---|---|---|
| 5,243,511 A * | 9/1993 | Zifferer | G05B 19/05 700/18 |
| 5,267,145 A * | 11/1993 | Zifferer | G05B 19/058 700/86 |
| 5,276,811 A * | 1/1994 | Zifferer | G06F 11/3664 700/86 |
| 5,349,518 A * | 9/1994 | Zifferer | G05B 19/05 700/83 |
| 5,867,382 A * | 2/1999 | McLaughlin | G05B 19/056 700/17 |
| 6,053,951 A | 4/2000 | McDonald | G06F 8/34 717/109 |
| 6,282,454 B1 * | 8/2001 | Papadopoulos | G05B 19/05 700/67 |
| 7,035,898 B1 * | 4/2006 | Baker | G05B 19/05 700/83 |
| 7,058,693 B1 * | 6/2006 | Baker, Jr. | H04L 67/025 700/17 |
| 7,958,488 B2 * | 6/2011 | Cifra | G01R 31/318357 717/106 |
| 8,452,749 B2 * | 5/2013 | Corella | G06F 3/0481 707/706 |
| 8,661,409 B2 * | 2/2014 | Austin | G06Q 30/04 717/113 |
| 9,058,029 B2 * | 6/2015 | Radl | G06F 8/34 |
| 9,176,640 B1 * | 11/2015 | Behboodian | G06F 3/04817 |
| 9,992,268 B2 * | 6/2018 | Atsatt | H04L 67/10 |
| 2002/0099845 A1 * | 7/2002 | Passanisi | G06F 8/60 709/236 |
| 2005/0034109 A1 * | 2/2005 | Hamilton | G06F 8/48 717/140 |
| 2006/0031664 A1 * | 2/2006 | Wilson | H04L 67/34 713/1 |
| 2006/0190624 A1 * | 8/2006 | Kegoya | H04L 67/125 709/246 |
| 2007/0044078 A1 * | 2/2007 | Cifra | G06F 8/34 717/135 |
| 2008/0270983 A1 * | 10/2008 | Ahadian | G06F 8/33 717/113 |
| 2010/0293525 A1 * | 11/2010 | Cifra | G06F 9/44526 717/109 |
| 2010/0293526 A1 * | 11/2010 | Austin | G06Q 30/0283 717/113 |
| 2010/0293528 A1 * | 11/2010 | Austin | G06F 8/34 717/113 |
| 2012/0253479 A1 * | 10/2012 | Radl | G06F 8/34 700/12 |
| 2014/0304766 A1 * | 10/2014 | Livne | H04L 63/20 726/1 |
| 2016/0004544 A1 * | 1/2016 | Paraschivescu | G06F 3/04842 715/744 |
| 2016/0062778 A1 * | 3/2016 | Hill | G06F 8/00 717/100 |
| 2017/0006135 A1 * | 1/2017 | Siebel | H04L 69/40 |
| 2017/0031661 A1 * | 2/2017 | Rabins | G06F 16/273 |
| 2018/0349149 A1 * | 12/2018 | Chute | G06F 9/45529 |

* cited by examiner

FIG. 6A

Program Variables 

| Name | Type | Actions |
|---|---|---|
| PLC_connected | Integer | |
| PROG_cycle_time | Integer | |
| tmp | Integer ▼ | init:0   Delete   Add Above   init |
| tm | Timer/Counter ▼ | Delete   Add Above |
| cnt | Timer/Counter ▼ | Delete   Add Above |
| state | State ▼ | init:ST_INIT   Delete   Add Above   init |

[Add Variable]

PLC Variables 

| Name | Direction | Word index | Bit offset | Size | Signed | Actions |
|---|---|---|---|---|---|---|
| plc_in_reg1 | ARGEE->PLC ▼ | 0 | 0 ▼ | Word (16 bit) ▼ | unsigned ▼ | Delete / Add Above |
| plc_out_reg1 | PLC->ARGEE ▼ | 0 | 0 ▼ | Word (16 bit) ▼ | unsigned ▼ | Delete / Add Above |

[Add Variable]

State Names 

| Name | Actions |
|---|---|
| ST_INIT | Delete   Add Above |
| ST_START | Delete   Add Above |

[Add Variable]

FIG. 7A

Program Variables

| Name | PLC_connected | Value: 0 | | | |
|---|---|---|---|---|---|
| Name | PROG_cycle_time | Value: 3 | | | |
| Name | tmp | Value: 0 | | | |
| Name | tm | Done: 0 | Engaged: 1 | Expiration Time: 1000 | Timer tick: 0 |
| Name | cnt | Done: 0 | Engaged: 0 | Expiration Time: 0 | Timer tick: 0 |
| Name | state | Value: ST_INIT | | | |

PLC Variables

| pk_in_reg1 | 0 |
|---|---|
| pk_out_reg1 | 0 |

Local IO

| Slot 0:TBEN Station 4 Pin Diagnostics | |
|---|---|
| Diagnostics | 0 |
| UL Low | 0 |
| UB Low | 0 |
| Slot 1:16DXP Input | |
| Combined Word | 16 |
| channel 1 | 0 |
| channel 2 | 0 |
| channel 3 | 0 |
| channel 4 | 0 |
| channel 5 | 1 |
| channel 6 | 0 |
| channel 7 | 0 |
| channel 8 | 0 |
| channel 9 | 0 |
| channel 10 | 0 |
| channel 11 | 0 |
| channel 12 | 0 |
| channel 13 | 0 |
| channel 14 | 0 |

FIG. 7B

| Edit Code | View HMI |

ARGEE Program

Timer tick 0
Timer tick 0

0. Condition: state=ST_INIT
   Actions:
   0. Timer start — Timer: tm, Expires (ms): 1000

1. Condition: true
   Actions:
   0. Assignment — Destination: plc_in_reg1, Expression: count(tm)
   1. Assignment — Destination: tmp, Expression: plc_out_reg1

2. Condition: state=ST_START
   Actions:
   0. Assignment — Destination: tmp, Expression: tmp+1

WEB-BASED PROGRAMMING ENVIRONMENT FOR EMBEDDED DEVICES

CROSS-REFERENCE TO RELATED APPLICATIONS

This application is a continuation of U.S. application Ser. No. 15/245,923, filed on Aug. 24, 2016, which priority benefit, under 35 U.S.C. § 119(e), of U.S. Provisional Patent Application No. 62/211,490, filed Aug. 28, 2015 by Roman Glistvain, titled "WEB-BASED PROGRAMMING ENVIRONMENT FOR EMBEDDED DEVICES," which applications are incorporated herein by reference in their entirety.

FIELD OF THE INVENTION

The present invention relates to programming development systems, and in particular to a web-based integrated development environment (IDE) system for embedded devices, wherein the system is hosted outside of the embedded device, and communicates via a web server inside the embedded device.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2014-2016, Turck Inc., All Rights Reserved.

BACKGROUND OF THE INVENTION

Embedded controllers (also called embedded devices, embedded controllers, embedded systems or, simply, microprocessors) generally are devices whose primary purpose is to perform an independent action such as encoding video, controlling robots, routing internet traffic, and so on. Such devices run autonomously without user intervention, however, there needs to be a way to configure/monitor/troubleshoot these devices.

"Embedded systems" are a type of systems (often including a plurality of embedded devices in one product that is offered for sale) that have applications that that are growing rapidly and expanding into different markets. One common typical characteristic of devices in this group is "fixed functionality". These devices start with a predefined set of application tasks and this set cannot be modified. These devices do not allow users to upload and run third-party programs. This assumption allows the manufacturer to reduce software complexity and to create very small, inexpensive and reliable systems.

The current generation of conventional embedded networking devices use standard off-the-shelf components such as operating systems (OS), file systems, web servers and SNMP agents (Simple Network Management Protocol (SNMP) is an internet-standard protocol for managing devices on IP networks) in order to provide the networking and application tasks. Due to various reasons, these systems typically involve expensive and complex hardware designs and inefficient software designs. Due to such inefficiencies, these systems contain huge amounts of code and require large amounts of RAM and high CPU speeds to support any reasonably robust networking infrastructure. This makes the devices expensive and unsuitable for certain applications. The large amount of code also results in a very slow startup time which blocks the adaptation of networking into certain devices such as TV sets, DVD players and other kinds of devices which need to be turned off and on quite often and require boot-up times on the order of one second. A number of U.S. patents attempt to facilitate the development of embedded controllers (also called embedded devices, embedded controllers, or, simply, microprocessors) in various ways, including the following U.S. Patents, each of which is incorporated herein by reference.

U.S. Pat. No. 8,209,694 to Glistvain issued on Jun. 26, 2012 with the title "Single-stack real-time operating system for embedded systems", and is incorporated herein by reference. This patent describes real time operating system (RTOS) for embedded controllers having limited memory includes a continuations library, a wide range of macros that hide continuation point management, nested blocking functions, and a communications stack. The RTOS executes at least a first and second task and uses a plurality of task priorities. The tasks share only a single stack. The task scheduler switches control to the highest-priority task. The continuations library provides macros to automatically manage the continuation points. The yield function sets a first continuation point in the first task and yields control to the task scheduler, whereupon the task scheduler switches to the second task and wherein at a later time the task scheduler switches control back to the first task at the first continuation point. The nested blocking function invokes other blocking functions from within its body and yields control to the task scheduler.

U.S. Pat. No. 7,383,368 to Schopp issued on Jun. 3, 2008 with the title "Method and system for autonomically adaptive mutexes by considering acquisition cost value", and is incorporated herein by reference. This patent describes a method for managing a mutex in a data processing system. For each mutex, an average acquisition cost is maintained that indicates an average consumption of computational resources that has been incurred by threads attempting to acquire the mutex.

U.S. Pat. No. 6,282,454 to Papadopoulos, et al. issued on Aug. 28, 2001 with the title "Web interface to a programmable controller", and is incorporated herein by reference. This patent describes an interface to a network of at least one programmable logic control system running an application program for controlling output devices in response to status of input devices. The web interface runs web pages from an Ethernet board coupled directly to the PLC back plane and includes an HTTP protocol interpreter, a PLC back plane driver, a TCP/IP stack, and an Ethernet board kernel. The Web interface provides access to the PLC back plane by a user at a remote location through the Internet. The interface translates the industry standard Ethernet, TCP/IP and HTTP protocols used on the Internet into data recognizable to the PLC. Using this interface, the user can retrieve all pertinent data regarding the operation of the programmable logic controller system. This is different than the present invention because U.S. Pat. No. 6,282,454 describes a web interface module and PLC that are separated via a backplane interface, while, in contrast, in the present invention the web interface is implemented inside the PLC (or industrial-automation controller or other microcontroller), not as one or more separate parts.

U.S. Pat. No. 7,058,693 to Baker, Jr. issued on Jun. 6, 2006 with the title "System for programming a programmable logic controller using a web browser", and is incorporated herein by reference. U.S. Pat. No. 7,058,693 describes a control system that includes an internet web interface to a network of at least one programmable logic control system (PLC) running an application program for controlling output devices in response to status of input devices. The web interface runs web pages from an Ethernet® board coupled directly to the PLC back plane and includes an HTTP protocol interpreter, a PLC back-plane driver, a TCP/IP stack, and an Ethernet board kernel. The web interface provides access to the PLC back plane by a user at a remote location through the internet. The interface translates the industry standard Ethernet, TCP/IP and HTTP protocols used on the Internet into data recognizable to the PLC. Residing in the PLC is a programming package accessible to a user through this interface which will allow the user to edit programs controlling the operation of the programmable logic controller system. Again, this is different than the present invention because U.S. Pat. No. 7,058,693 describes a web interface module and PLC that are separated via a backplane interface, while, in contrast, in the present invention the web interface is implemented inside the PLC (or industrial-automation controller or other microcontroller), not as one or more separate parts.

Prior art systems include:

(1) statPLC web, described as browser based programming, wherein one points their favorite web browser to the statPLC web server and starts editing. (See www.autstat.com/index.php/statplc-web.html accessed Aug. 19, 2015, which indicates a postal address at Baier automation & statistics, Ufergasse 68, 3500 Krems, Austria.) There is no precise information about how things are hosted, but based on the available information it is likely that it works in the following way: the user runs a browser application on their local client computer, which causes an application to run on a web-based server computer to edit and compile programs to obtain executable code, that is then loaded from the web-based server into the embedded device local to the user. The fact that statPLC web supports C development likely indicates that they have some sort of C compiler, and it is unlikely that the C compiler would run on Cortex M3 CPU that they claim to be supporting.

(2) Tri-Logic (a Java applet-hosted inside the device because of Java limitation), which supports simulation (See www.tri-plc.com/trilogi3.htm, accessed Aug. 19, 2015, which indicates a postal address at 1685 H ST #198, Blaine Wash. 98230, United States.). (3) ICP-DAS WISE (hosted inside the device). (See wise.icp-das.com/Introduction.html, which indicates its Headquarters at No. 111, Guangfu N. Rd., Hukou Township, Hsinchu County 30351, Taiwan, R.O.C.)

(4) MBLOGIC ladder editor on Web (hosted on the same device). (See mblogic.sourceforge.net/techdemo/ladtest/ladderhelp.html)

(5) Ladder with compiler on the client-side generating code for the target device (Arduino/AVR). (See github.com/tadpol/Avrian-Jump.) This can be combined with monitoring Ladder in real-time using JavaScript (which also provides some simulation). (See mblogic.sourceforge.net/techdemo/techdemo.html.)

(6) Managing localStorage to avoid losing work with programming environment (even managing multiple sessions within the same browser). (See mblogic.sourceforge.net/techdemo/techdemo.html.)

(7) Remote access to devices (See research.microsoft.com/pubs/161386/gibraltar.pdf and www2014.kr/wp-content/uploads/2014/05/companion_p135.pdf, accessed Aug. 19, 2015)

(8) Beck PLC (Web PLC) Hosting is on the device itself, wherein the device allows one to upload information to a central Beck server for IOT functionality. (See www.beck-ipc.com/files/manual/com.tom_WEB-PLC_GettingStarted_V16.pdf,)

According to Wikipedia (en.wikipedia.org/wiki/Ladder_logic, accessed Aug. 19, 2015), "ladder logic" was originally a written method to document the design and construction of relay racks as used in manufacturing and process control. Each device in the relay rack would be represented by a symbol on the ladder diagram with connections between those devices shown. In addition, other items external to the relay rack such as pumps, heaters, and so forth would also be shown on the ladder diagram.

Ladder logic has evolved into a programming language that represents a program by a graphical diagram based on the circuit diagrams of relay logic hardware. Ladder logic is used to develop software for programmable logic controllers (PLCs) used in industrial control applications. The name is based on the observation that programs in this language resemble ladders, with two vertical rails and a series of horizontal rungs between them. While ladder diagrams were once the only available notation for recording programmable controller programs, today other forms are standardized in IEC 61131-3.

Accordingly, there is a need for improved methods and apparatus for developing software for PLCs.

SUMMARY OF THE INVENTION

In some embodiments, the present invention provides an apparatus for providing a web-based programming environment for developing, loading, and debugging a user program into an industrial automation controller (IAC), wherein, in some embodiments, the IAC includes a web server internal to the IAC. In some embodiments, this apparatus includes: a client computer that includes a client computer file system; a software program that resides and executes on the client computer to create a programming environment including a program editor and compiler, wherein the programming environment is outside the industrial automation controller that the programming environment is controlling, and a software program that resides and executes inside the industrial automation controller. In some embodiments, the compiler generates a bytecode program that is downloadable from the client computer into the IAC, and then is executable in the IAC. In some embodiments, the programming environment includes an import/export unit which allows a user to save/load project files through the client computer file system. If the software program is obtained from a hosting server and loaded into the client computer, then once the programming environment software is loaded from the hosting server a first time into the client computer, the connection to the hosting server is optionally disconnected since the hosting server is no longer required for the operation of the programming environment. In some embodiments, the programming environment software also includes a simulator that allows the human user to simulate the compiled bytecode program in the client computer.

In some embodiments, the present invention provides a non-transitory computer-readable medium having stored thereon instructions for a programming environment that cause a suitably programmed client computer system to perform a method, wherein the method includes: eliciting and receiving, from a human user, graphical-user-interface (GUI) information that specifies a first GUI software program to control an industrial automation controller; compiling the first GUI software program into a bytecode program using the client computer system; communicating between a web browser in the client computer system and a web server implemented inside the industrial automation controller; loading the bytecode program into the industrial automation controller from the client computer system; and presenting a programming environment to the human user from the client computer, wherein the programming environment includes the communication between the web browser in the client computer system and the web server implemented inside the industrial automation controller.

In some embodiments, the instructions for the programming environment are loaded into the client computer from a non-transitory computer-readable medium connected to a hosting server that is then optionally disconnected from the client computer while the programming environment communicates to the industrial automation controller. In some embodiments, the instructions for the programming environment are loaded into the client computer from a non-transitory computer-readable medium without a hosting server.

In some embodiments, the present invention provides a computer-implemented method for providing a web-based programming environment for developing, loading, and debugging a user program into a PLC. This method includes: loading a web server program into firmware within a microprocessor (e.g., in some embodiments, a programmable logic controller (PLC)) used in an embedded environment; connecting the PLC to a client computer having a web-browser program executing thereon; eliciting and receiving by the client computer, from a human user, graphical-user-interface (GUI) information that specifies a first GUI software program to be used to control the microprocessor; compiling, in the client computer, the first GUI software program into a bytecode program using the client computer that is outside the PLC; loading the bytecode program into the microprocessor from the client computer and/or hosting server; and presenting, from the client computer to the human user, a programming environment that includes simulation features from the PLC.

BRIEF DESCRIPTION OF THE FIGURES

FIG. 1 is a block diagram of a prior-art system 101 wherein a traditional web application accesses the same domain on which it is hosted. All user actions are sent to the same server the application is hosted on.

FIG. 6A is a left-hand portion 601 of a screen shot of one embodiment of a code editor 600, according to some embodiments of the present invention.

FIG. 7A is a left-hand portion 701 of a screen shot of one embodiment of a code debugger 700, according to some embodiments of the present invention.

FIG. 7B is a right-hand portion 702 of a screen shot of one embodiment of a code debugger 700, according to some embodiments of the present invention.

DETAILED DESCRIPTION OF THE INVENTION

Figure 1:
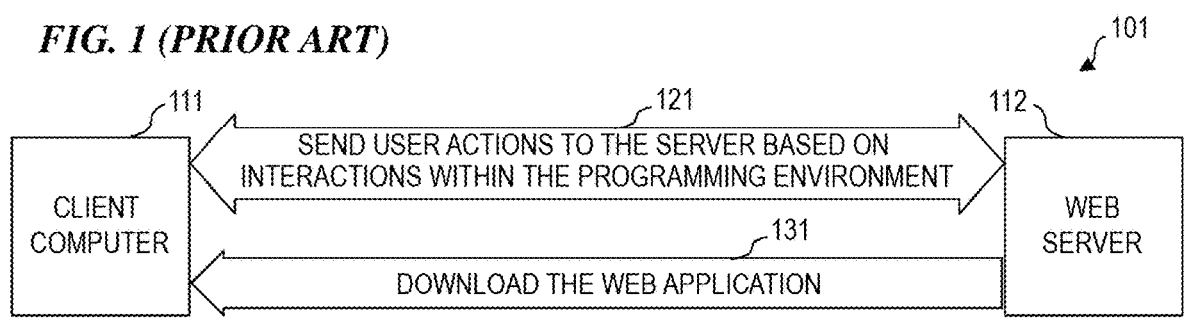

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, the present invention includes a web-based programming language (some embodiments are sometimes called ARGEE™) designed for people familiar with Ladder Logic PLC Programming. The ARGEE™ programming language is based on a "Condition"→"Actions" paradigm. This means that the virtual machine cyclically evaluates program conditions and executes associated actions, which have different outcomes depending on whether each condition is true or not. This approach resembles Ladder Logic programming.

In some embodiments, the present invention elicits and receives from a human user, information via a graphical user interface (GUI), wherein the information is used to generate what is herein called "a GUI program" (i.e., a program that is generated by, and displayed to, the user via the graphical user interface, rather than the program that presents the GUI to the user).

The ARGEE™ programming language of the present invention provides functions to handle timers, counters, operations using integer arithmetic. The programming language allows exchanging data with upper level PLC as well as controlling local/remote sensors connected to the PLC device.

In some embodiments, the ARGEE™ programming environment provides an Import/Export unit which allows the user to save/load files to the local hard drive of the client computer or saving/loading them to the remote computers accessible via the network. Any directory (local or remote) which is accessible through the client computer file system can be used to load/save the project files.

In some embodiments, there are two main parts of the ARGEE™ system:
(1) The first element is the ARGEE™ programming environment that compiles the GUI program into a "bytecode" program of the virtual machine.
(2) The second element is the virtual machine residing in the device which cyclically executes the bytecode program generated and uploaded by the ARGEE™ programming environment.

ARGEE™ Programming Environment

One of the design goals when creating the ARGEE™ programming environment was to create an environment which would be independent of any particular operating system, that is, an environment that is OS-independent, and which will not require a customer to install any software on his or her machine. Naturally, the web based programming environment was chosen.

The programming Environment is completely JavaScript based and is executed in its entirety in the browser. The browser responds to user actions for editing the program, compiling the program, testing the program.

The compiler is also integrated into the environment and runs in the browser. It parses the user program and generates the bytecode program, which is executed by the virtual machine residing in the device or, alternatively by the simulator residing in the client computer.

The debugger cyclically pulls information, in background, from the device. In some embodiments, that information contains:
1) Values of all program, IO and PLC variables.
2) Conditions that were active in the last scan cycle.

Based on that information the debugger generates a real-time view of variables and how they change, as well as which conditions are true at that specific instant of time.

The environment is designed in such a way that when the code is edited, even if the browser loses the connection to the device or if the browser is closed, no code is lost. The code is saved into the browser localStorage and is recovered the next time the environment is reopened.

Virtual Machine

The main design goal behind the ARGEE™ programming environment was to minimize the RAM/Flash footprint within the device.

In order to achieve this goal the most of the memory intense/computational work is pushed into the environment. The environment performs all the code editing, compiling, debugging. Only a very small number of commands are exchanged with the actual device in meantime. During the whole editing process, the device does not exchange any information with the browser. All the intermediate program storage happens in the browser. After a successful compilation, the bytecode along with the optional program text is uploaded into the device.

The device runs a stack-based virtual machine which is very simple and has just a few opcodes.

ARGEE™ Simulation

In some embodiments, the ARGEE™ programming environment provides a built-in simulation mode. In the simulation mode the developer selects a device he or she wants to simulate and the environment operates as if it is talking to a real device. The program can manipulate all the input/output (TO) points and PLC variables within the simulated environment. The user can force inputs points and/or PLC variables and test the program operation this way. In some embodiments, the simulation is accomplished by running the virtual machine inside the environment.

ARGEE™ Hosting

Even though the device running the ARGEE™ program contains an embedded web server, the ARGEE™ environment is not hosted on the device itself. It is hosted on the outside server. This is done for the following reasons:
1) To minimize storage requirements on the embedded device, and
2) To facilitate faster update/distribution cycles of the environment to large number of clients. Since the device portion is minimized and the goal is to make as few changes to it as possible, most of the changes are expected to happen in the environment. Therefore, by decoupling the environment hosting from the device we allow the customer to change environment without having to change the firmware within the device itself which could be hard (due to geographical position of devices) and dangerous (because all the affected devices need to be disconnected from the process they are controlling).

The environment is downloaded from the hosting server in one shot and executed in the browser. In some embodiments, the hosting server is never contacted after the download.

Figure 2:
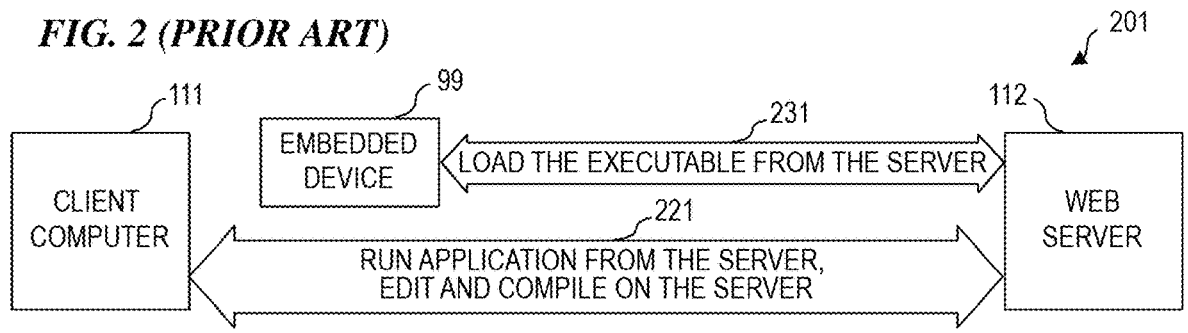
FIG. 2 is a block diagram of a prior-art system 201 showing another common approach in which the application is run from the web server 112 connected to the user's client computer 111 via the internet, and the executable code is loaded into the embedded device 99 from the web server (either directly or indirectly) through the client computer 111.

FIG. 1 is a block diagram of a prior-art system 101 wherein a traditional web application accesses the same domain on which it is hosted. All user actions are sent to the same server the application is hosted on:

FIG. 2 is a block diagram of a prior-art system 201 showing another common approach in which the application is run from the web server 112 connected to the user's client computer 111 via the internet, and the executable code is loaded into the embedded device 99 from the web server (either directly or indirectly through the client computer 111.

Figure 3A:
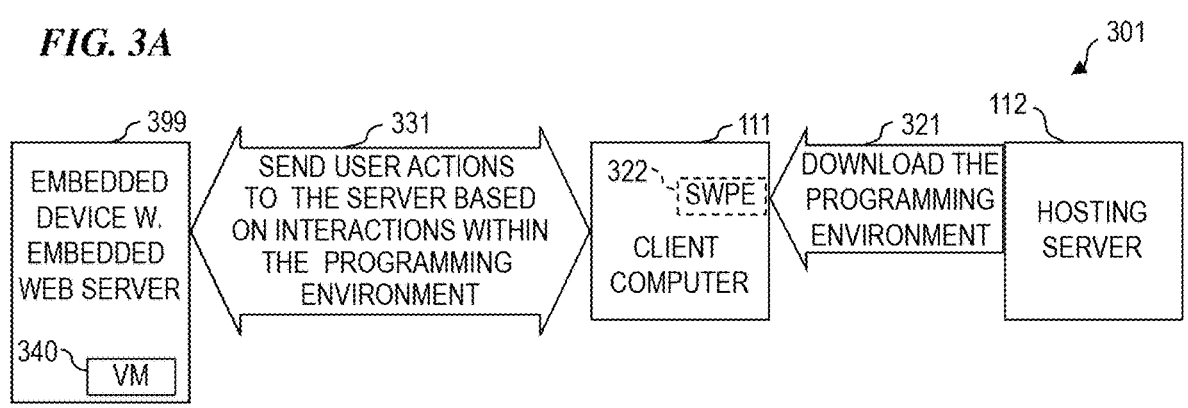
FIG. 3A is a block diagram of a system 301 using ARGEE™ programming, according to some embodiments of the present invention in which the situation is totally different.

FIG. 3A is a block diagram of a system 301 using the ARGEE™ programming environment according to some embodiments of the present invention in which the situation is totally different. Shown in FIG. 3A is microcomputer that can be or is used as an embedded controller 399 (e.g., in some embodiments, device 399 is an industrial automation computer (IAC) such as programmable logic controller (PLC) or other suitable integrated-circuit chip or chips). In some embodiments, a software program that controls a programming environment is loaded into client computer 111 (in some embodiments, the software program that controls the software programming environment (SWPE 322, shown in dashed lines since it is being loaded just the first time and thereafter resides in client computer 111) is downloaded 321 into client computer 111 from a hosting server 112). In some embodiments, client computer 111 executes the software that controls the programming environment, which elicits and receives user actions from a human user (some embodiments include other interactions that are also used to interact with the embedded device 399. In some embodiments, the embedded device 399 includes a small web server program embedded in its firmware, which receives user actions from the client computer 111. In addition, the embedded device 399 runs a stack-based virtual machine (VM) 340, which is very simple and has just a few opcodes.

Figure 3B:
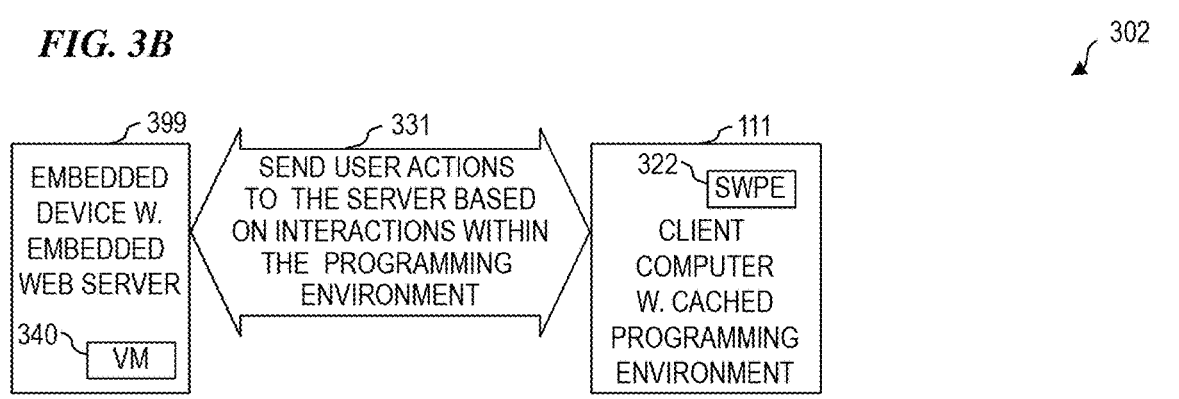
FIG. 3B is a block diagram of a system 302 using ARGEE™ programming (it represents a mode of system 301 in which, after the initial connection to the host server in which the programming environment is downloaded into client computer 111, the hosting server 112 is disconnected, according to some embodiments of the present invention.

FIG. 3B is a block diagram of a system 302 using the ARGEE™ programming environment (it represents a mode of system 301 in which, after the initial connection to the host server in which the programming environment is downloaded into client computer 111, the hosting server 112 can be disconnected and the programming environment runs between the client computer 111 and the embedded device 399 which has a web server and simulation/virtual-machine software running inside it, according to some embodiments of the present invention.

Figure 4:
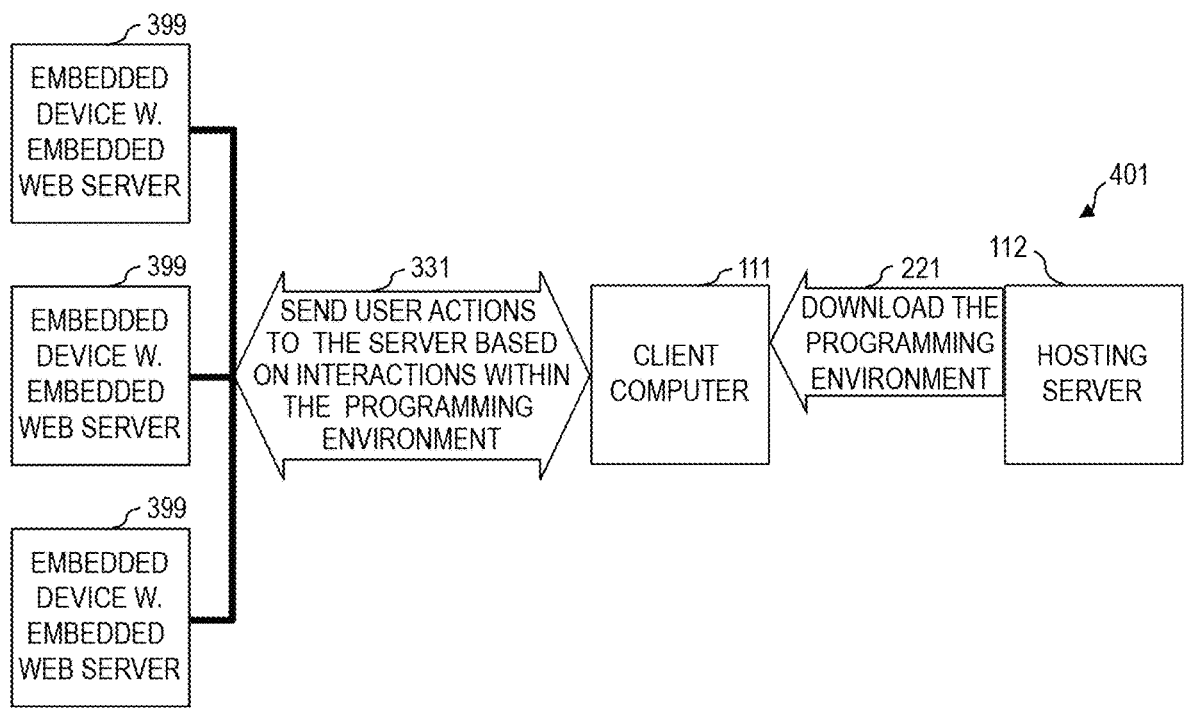
FIG. 4 is a block diagram of a system 401 using ARGEE™ programming, according to some embodiments of the present invention.

FIG. 4 is a block diagram of a system 401 using the ARGEE™ programming environment, according to some embodiments of the present invention in which the client computer 111 is used to control and interactively debug a plurality of embedded devices 399. In ARGEE™, the environment asks the user to select the embedded device it is going to control. This allows the user to use the same environment to talk to all devices in his facility. In some embodiments, other aspects of system 401 are as described above in the descriptions of FIG. 3A and FIG. 3B.

Since the externally hosted environment does not change dynamically based on client actions, it is possible to use the environment automatically without an internet connection. When the user visits the "Hosting Server" for the first time, the environment is automatically cached in user's browser. Later on, the user can retype the URL without an internet connection and the environment will be loaded from the cache. This process is automatically managed by any HTML5-compliant browser.

The use of environment without internet connection is important in certain industrial automation organizations since certain areas of the plant may not have access to the internet due to security or geographical location. This is shown in FIG. 3B, wherein the client computer can connect to the embedded device (e.g., in some embodiments, a PLC) even when the global network connection is no longer available, since the programming environment is cached on the client computer.

As shown in FIG. 4, it is possible to edit/compile/debug multiple ARGEE™ programs and connect to multiple devices using different browser windows all running on a single client computer 111. In some embodiments, this is achieved by using different storage sections within local Storage provided by HTML5 per domain. In some embodiments, each section is identified by the IP address of the device that is accessed.

Figure 5:
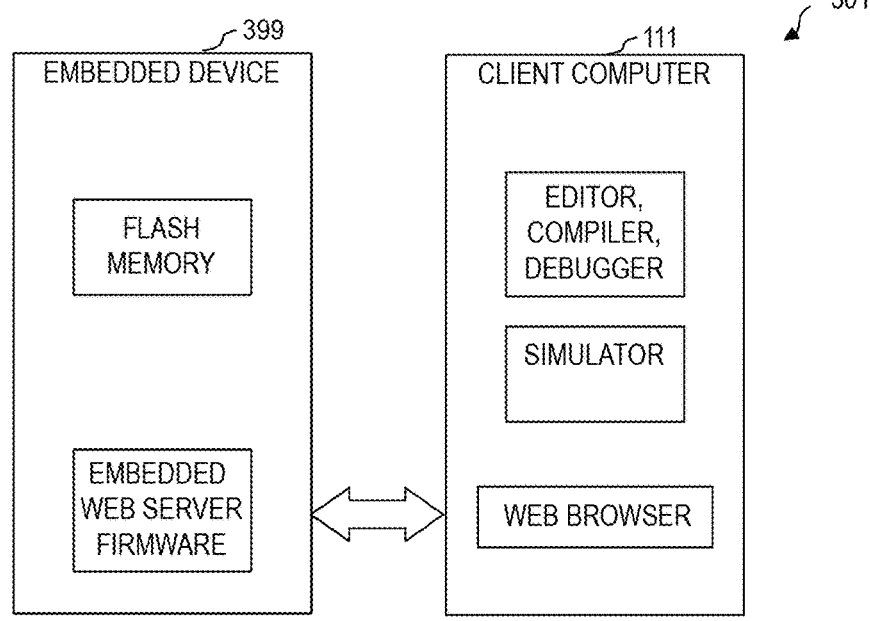
FIG. 5 is a block diagram of a system 501 using ARGEE™ programming, according to some embodiments of the present invention.

FIG. 5 is a block diagram of a system 501 using the ARGEE™ programming environment, according to some embodiments of the present invention. In some embodiments, the industrial automation controller (IAC; e.g., embedded device) 399 includes a small embedded web server that facilitates communications with the client computer 111 on which a web browser is running. The web browser in client computer 111 provides a flexible way of providing a GUI-based interface for interactions with the human user. In some embodiments, client computer 111 also includes a program editor (which includes a GUI that elicits and receives, from a human user, information used to create a high-level graphical program of what the IAC will execute), a compiler (which will compile the high-level graphical program into a bytecode program that can be loaded into and executed by the IAC) and a debugger, as well as a simulator that simulates execution of the bytecode program as if it were executing inside the IAC 399, allowing the user to observe and control things that would be occurring inside the IAC 399 if the bytecode program were executing there. In some embodiments, the IAC 399 includes FLASH or other non-transitory re-writable internal storage.

Some Novel Aspects of the Present Invention

The "ARGEE™ Hosting section" is related to industrial automation. The situation is fairly unique in that the programming environment is hosted outside of the device. There may be applications in other areas where the hosting model is similar but not in programming/PLC environments that operate this way.

This hosting model allows the present invention to achieve three goals:

1) The present invention reduces the storage requirements on the embedded device.

2) The present invention allows for faster update cycles of the environment program itself, since the environment can be changed without affecting the firmware in the device.

3) The present invention makes it easier to distribute changes to the environment to a large number of customers, since there is no need to update devices every time the environment changes.

ARGEE™ Programming Environment

1. Introduction

The ARGEE™ programming environment includes a simple programming language which can run on multiprotocol platform devices. It includes web based programming environment which allows writing programs as a set of condition→action statements. The web environment can compile the code into a bytecode of a virtual machine which is running in the embedded firmware.

The environment provides functions to handle timers, counters, operations using integer arithmetic.

Two embodiments that involve the ARGEE™ programming environment include:

1) Stand-alone device: A device that can do certain actions on its own 10 data. This device can also receive and send data to upper level PLC.

Use cases:
a. Stand-alone proportional-integral-derivative (PID) controller,
b. Preprocess input/output (IO) data before sending it to PLC, or
c. Complex JO handling when the PLC is disconnected in order to bring the system to a known state.
2) BEEP (Backplane Ethernet Extension Protocol) with the ARGEE™ programming environment: ARGEE™ device capable of controlling BEEP-capable Remote JO nodes.
2. Product Requirements
In some embodiments, a standalone ARGEE™ component is integrated into the firmware of the PLC or other embedded controller.
2.1 Common Functionality
1) In some embodiments, compatible embedded devices (e.g., PLCs) will run a virtual machine that can execute ARGEE™ bytecode.
2) In some embodiments, any compatible browsers (e.g., Firefox V26, Chrome v32 and the like) are used. Binary transfers are used to exchange information. JavaScript™ Generators are used.
3) In some embodiments, the virtual Machine can access Local I/O, Program variables, PLC Variables (Communication with upper level PLC ModbusTCP, ProfiNET and EIP).
2.2 Stand-Alone Device
In some embodiments, the ARGEE™ programming environment cannot be accessed from the device, since the HTML/JS files are not part of the device firmware (they are stored on the developer's client computer and he or she can connect to a virtual machine running inside the device).
The ARGEE™ programming environment can be hosted on a hosting server and the developer can use the hosting server to download the environment once; it will be automatically cached and it then can be used even without internet connection (using HTML5 cache manifest file).
In order to access the ARGEE™ programming environment in the stand-alone device version, one needs to open the ARGEE™ environment and enter the IP address of the ARGEE™ device that is to be programmed.
2.3 ARGEE™ Programming Language
In some embodiments, the ARGEE™ programming language includes the variable types shown in Table 1.

TABLE 1

| Type | Description | Type | Allowed arithmetic expressions | Specific actions | Size in bytes |
| --- | --- | --- | --- | --- | --- |
| Integer Variables | Variables defined in the PP program. | All these variables are 32-bit signed integers. | All integer arithmetic | Assignment | 4 |
| Retain Integer | Variables which are automatically saved to flash. | All these variables are 32-bit signed integers. | All integer arithmetic | Assignment | 8 bytes (4 bytes of data 4 bytes of additional information) |
| PLC Variables | Variables mapping upper level PLC (Modbus/TCP or Ethernet/IP) exchange data to an integer variable accessible in the program. | They are mapped to integer variables in the program | All integer arithmetic | Assignment | 20 |
| Timer/ Counter | Timers Counters. and can be used with appropriate functions such as "expired", "count" and appropriate actions such as "Timer On" | complex data types | Only used as argument to functions "expired" and "count" | Specific actions: Timer on, Timer off, Start timer, Count up, Count down | 16 |
| State | Integer variable which is used to designate states in state machine. Behaves identically to a regular integer variable except for 2 things: 1) Initialize: will list states 2) In the debugger a state name matching the current value will show up | 32-bit integer | All integer arithmetic | Assignment | 4 |
| Local IO | Input/Output/Diagnostic points | They are mapped to integer variables in the program | All integer arithmetic | Assignment | (not allocated out of 1 KB of RAM) |
| System variables | PLC Connected | 32-bit integer | | Only 1 bit is used to indicate PLC connected state | 4 |

TABLE 1-continued

| Type | Description | Type | Allowed arithmetic expressions | Specific actions | Size in bytes |
|---|---|---|---|---|---|
| System variables | Max Cycle time (since program start) | 32-bit integer indicating time in ms | | Time from the previous cycle to the current cycle. | 4 |

In some embodiments, the mapping of PLC variables is shown in Table 2:

TABLE 2

| Fieldbus | Description of Mapping Points |
|---|---|
| Ethernet/IP | If ARGEE ™ program is loaded, connection points 101, 110 will transfer PLC <->ARGEE ™ exchange data. The data starts from offset 0 for both Input (data to PLC) and Output (data form PLC) connections. |
| Modbus/TCP | ARGEE ™ system will transfer its data in registers: 1) 0x4000 (ro) for Input data (ARGEE ™-> PLC) 2) 0x4400 (rw) for the Output data (PLC-> ARGEE ™) |

Programming paradigm:
1) Condition→Actions paradigm
2) Condition—Boolean expression: has to evaluate to true or false
3) Actions: operations which may involve variables and expressions.
   a. Some actions can have side effects even when the condition is false.
   b. If no action in the condition have side effects, then program execution is faster
Expressions:
1) Expressions consist of
   a. Operands:
      i. program variables,
      ii. PLC variables,
      iii. Timer/Counter variables
      iv. Local IO
   b. Operations:
      i. Numeric Math: +, *, /, %
      ii. Boolean Math: &, |, !
      iii. Comparison: >, <, =, >=, <=
      iv. Built-in math functions: min, max, abs
      v. Change of state: F_COS
         1. This function checks if the state of the variable changed between the previous scan cycle and the current scan cycle.
      vi. Timer/Counter:
         1. expired,
            a. Check if the timer or counter accumulator is over the preset value
         2. count
            a. Returns the current timer or counter accumulator
      Note: In some embodiments, Bitwise arithmetic (e.g., Bitwise and, bitwise or, bitwise not, shifts) is not supported.

2) In some embodiments, the Actions are as shown in Table 3

TABLE 3

| Action | Condition = FALSE | Condition = TRUE |
|---|---|---|
| Assignment | No action | assigns a destination variable to a result of expression evaluation. |
| Coil | Resets a variable to 0 | Sets the variable to 1 |
| Timer start | No action | If the timer is not started, it starts the timer. Otherwise it restarts the timer. The timer is executed in the background until the accumulator >= "Expires" Preset value. |
| Timer On | Resets the timer accumulator and Done flag. | If timer Done flag is 0 -run the timer. The timer is accumulated every millisecond until the accumulator >= "Expires" Preset value. In that case the Done flag is raised. |
| Timer Off | If timer Done flag is 0 -run the timer. The timer is accumulated every millisecond until the accumulator >= "Expires"; Preset value. In that case the Done flag is raised. | Resets the timer accumulator and Done flag. |
| Comment | — | — |
| Count up | | increments the counter whenever the condition changes from false to true. |
| Count down | | decrements the counter whenever the condition changes from false to true. (note - the Preset can be a negative value) |
| Reset | — | Restarts the counter to - 0 |
| Trace | — | Record a trace information into a tracebuffer |

2.4 Requirements of Some Embodiments of the Virtual Machine/Environment.
1) In some embodiments, the amount of code+RAM−6 kb presets for Timers/counter/PLC variables/RemoteIO Variables, RAM used to store values of all variables.
2) In some embodiments, the amount of program text plus human-machine-interface (HMI) text=256 KB
3) If the division by zero is detected, the program is stopped and division-by-zero error is recorded in the event log.
2.5 Recovery Tool:
In some embodiments, the ARGEE™ program will start execution 10 seconds after the power-up. This gives the programmer a chance to send "back to defaults" command over an embedded device interface tool. The tool will set defaults.
2.6 Programming Environment:
2.6.1 Code Editor
FIG. 6A is a left-hand portion 601 of a screen shot of one embodiment of a code editor 600, according to some embodiments of the present invention.

Figure 6B:
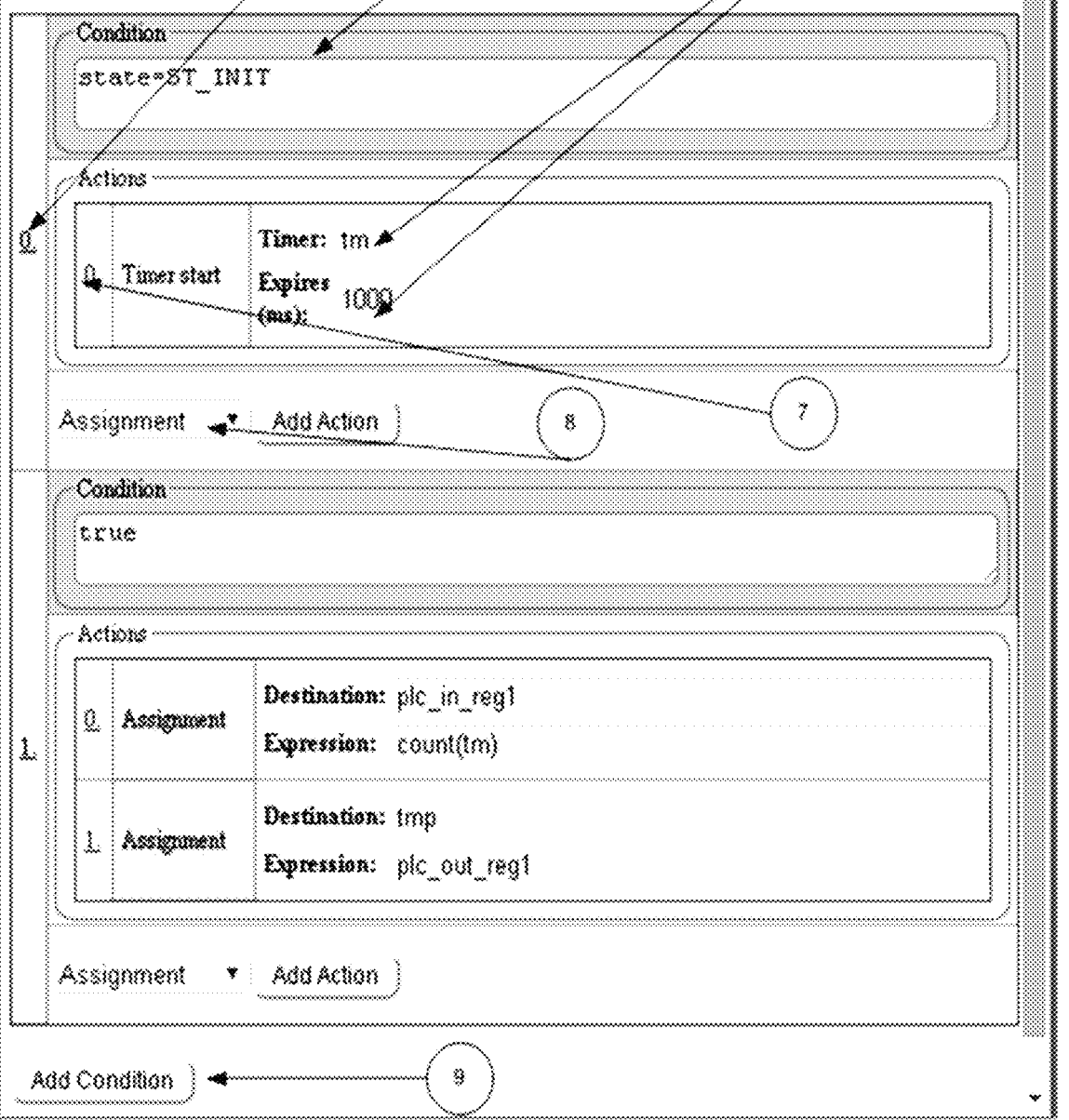
FIG. 6B is a right-hand portion 602 of a screen shot of one embodiment of a code editor 600, according to some embodiments of the present invention.

FIG. 6B is a right-hand portion 602 of a screen shot of one embodiment of a code editor 600, according to some embodiments of the present invention.

In some embodiments, the Code editor 600 allows one to add/remove/move variables, conditions, and/or actions.

On the left-hand portion 601 of the code editor 600, there are definitions of variables.

There are three main types of variables:

1) Program variables (reference number 1 of FIG. 6A): All Integer, Timer/Counter, state variables and Retain Integers are defined here.

2) PLC Variables (reference number 2 of FIG. 6A): these are used to define the communication with an upper-level PLC. Each PLC variable requires the programmer to define the following:
   a. Section (From upper PLC perspective)—Input→data sent to the PLC, Output—Data received from the PLC.
   b. Byte offset, Bit offset, Number of bits: place in the section
   c. Signed/unsigned 3) State Names (reference number 3 of FIG. 6A): one large enumeration containing state names for all state machines. Inside Conditions/Actions it is possible to press "Ctrl-S" to begin the list of states to assign/check variable. State names are used to initialize state variables.

On the right-hand portion 602 of the screen of code editor 600 there is a program editor:

1) Clicking on button "Add condition" (reference number 9 of FIG. 6B) allows to add a new condition at the end of the program.

2) In order to define the condition, field (reference number 4 of FIG. 6B) needs to be edited.

3) In order to add actions to condition, specify the type of condition by selecting from enumeration next to "Add Action" button and click on button "Add Action" (reference number 8)

4) Different Actions require different parameters. For example "Timer start" action requires the timer argument and expiration time in milliseconds (shown in (reference number 6 of FIG. 6B)). Clicking on condition link (reference number 5 of FIG. 6B) opens a pop-up menu for condition manipulation. This allows one to move condition using cut/paste as well as insert condition above or below the current condition.

5) Clicking on action link (reference number 7 of FIG. 6B) opens a pop-up menu for action manipulation. This allows one to move action around through cut-and-paste operations.

6) There are keyboard shortcuts which can be used on any edit field in the program editor:
   a. "Ctrl-q" brings the list of program/plc/timer variables:
   b. "Ctrl-I" brings the list of LocalIO variables
      Note: LocalIO datapoints are extracted out of the MP1 IO Database inside the device.
      The datapoint names should be consistent with the Web/IOA.
   c. "Ctrl-f" brings a list of built-in functions
   d. "Ctrl-s" brings the list of State names Selecting any one of the elements of these lists inserts it into the active editing field. Once the program is created, pressing "Run" creates the bytecode, uploads it to the virtual machine, starts the execution and makes it a boot project. In some embodiments, if errors are detected after the "Run" button is pressed, they are displayed right under the "compile" button. Only one error is shown each time. If more then one error is present, fixing the currently displayed error and recompiling will show the next one.

If the compilation was successful, the status would indicate the amount of space left in each section. In case of successful compilation, the IDE would re-download parameters from the device and store them into the parameter section of the program. This ensures that if another browser is used in meantime to configure the parameters, the changes will be consistent.

2.6.2 Code Debugger

Once the program is running, the user can click on "Test" in order to enter the debugging screen. The debugging screen (see 701 and 702 of FIG. 7A and FIG. 7B) shows a real-time view of program variables, timer/counter variables, PLC variables, Local IO points as well as the static view of the program. The variable values are self refreshed. The debug screen also shows which conditions are "true" in real-time. The conditions that are "true" are shown with Green background color.

FIG. 7A is a left-hand portion 701 of a screen shot of one embodiment of a code debugger 700, according to some embodiments of the present invention.

FIG. 7B is a right-hand portion 702 of a screen shot of one embodiment of a code debugger 700, according to some embodiments of the present invention.

In some embodiments, Debug screen (701 and 702 of code debugger 700) also provides the capability to modify Program variables: Integer/Retain/State variables.

Pressing "Modify Variables" goes to the edit screen where the user can modify variables. Pressing "Finish Modifications" will submit these variables into the program. Only the updated variables will be submitted (not all the variables). Please note that if Retain Integer is updated this way, the new value is synced into FLASH memory within one second after hitting "Finish Modifications".

2.6.2.1 Human-Machine Interfaces (HMI)

In order to provide simple visualizations, Web-based HMI can be used. In some embodiments, the ARGEE™ HMI can create multiple screens, each of which can display expressions using program variables, as well as providing capability to enter values that are transferred into the program variables.

In some embodiments, there are five types of Human-machine-interface (HMI) elements:

1) Display number or state: displays an expression involving program variables. The expression can make use of ARGEE™ language constructs. State variables can be displayed with this element here, which will allow displaying predefined strings mapped to an integer.

2) Display number with valid range: this indicates whether or not an expression is within a valid range or not. If the expression is within a valid range, then the background color of the field is green, otherwise it is red. The color of the screen also changes to reflect the color of the expression. To avoid confusion, only one "Status with valid range" field should be used in one screen.

3) Enter number: an edit field which can specify a value an appropriate program variable should be set to.

4) Enter state: Allows entering a selection of a specific state which a specific state variable should be set to. This can be used to specify a state of the program or to use a state variable for "string based" selection of an operating mode (recipe) the program can be in.

5) Button: used to submit the "variable" type expressions. Please note that "Button" element should be attached to a program variable.

In some embodiments, when the HMI allows entering a value of a retain variable, the retain variable will be synced to FLASH memory within one second from submission.

2.7 Handling Retain Variables

In some embodiments, the embedded-device block stations do not provide a simple-to-use method for handling retain variables such as flash-sync-on-power-loss or battery-backed ram. Therefore, in some embodiments, the ARGEE™ virtual machine performs syncing of retain variables to FLASH memory based on the following algorithm:

1) When HMI (of Modify Variables in Test mode) submits variables, they are written to the FLASH memory immediately.

2) When retain variable is modified inside the program, the flash write cycle is delayed by up to three minutes.

3) The retain variables are stored in four different sectors in FLASH memory in a journaling fashion, allowing recovery to some known state in case the last write failed, as well as providing the ability to extend the longevity of the FLASH memory. By using the three-minute inter-sync delay, it guarantees at least two years of operation even in case the user writes to a retain variable in every scan cycle.

2.8 Trace Functionality

In some embodiments, the present invention provides the ability to add Trace statements into the code to show the true run time behavior of the program. If trace statements are present, then a new menu element "Show Trace" shows up when one is in "Test" in ARGEE™ mode. The last 100 traces are shown in real time along with the code they refer to. The most recent trace appears on top. If one presses "Stop trace" in this screen, then it will show the snapshot of the last up to 4096 traces. "Resume Trace" will keep showing last 100 traces in real time. If one presses "Show Variables," the program switches back to the variable display screen.

2.9 IO Variable Formats

In some embodiments, the ARGEE™ environment provides a list of all the IO datapoints a specific device exposes. These datapoints, however, may not present the information in the format the user expects. All the IO datapoints are unsigned integers, therefore if the datapoint presents a signed value, additional work must be done to extract the negative value. In order to avoid these issues, a new set of IO variable formats was introduced in some embodiments:

Arbitrary addressing within a section:

IO.Slot2.Input.X→extract a specific bit X from the input section.

IO.Slot2.Input.X.Y→Extract an unsigned specific integer which has "Y" bits of data from
the input section starting from bit position "X".

IO.Slot2.Input.X.Y.s→Extract a signed integer which has "Y" bits of data from the input
section starting from bit position "X".

IO.Slot2.Input.X_Z.Y→Extract an unsigned specific integer which has "Y" bits of data
from the input section starting from byte position "X", bit position "Z".

IO.Slot2.Input.X_Z.Y.s→Extract a signed integer which has "Y" bits of data from the
input section starting from byte position "X", bit position "Z".

Addressing relative to a known element of the section:

IO.Slot1.Input.Read_data_1_1.s→Extract a signed integer from the element "IO.Slot1.Input.Read_data_1_1"

IO.Slot1.Input.Read_data_1_1.X→Extract a specific bit X from the element "IO.Slot1.Input.Read_data_1_1".

IO.Slot1.Input.Read_data_1_1.X.Y→Extract an unsigned integer which has "Y" bits of
data "IO.Slot1.Input.Read_data_1_1" starting from bit position "X".

IO.Slot1.Input.Read_data_1_1.X.Y.s→Extract a signed integer which has "Y" bits of
data "IO.Slot1.Input.Read_data_1_1" starting from byte position "X", bit position "Z".

IO.Slot1.Input.Read_data_1_1.X_Z.Y→Extract an unsigned integer which has "Y" bits
of data "IO.Slot1.Input.Read_data_1_1" starting from byte position "X", bit position "Z".

IO.Slot1.Input.Read_data_1_1.X_Z.Y.s→Extract a signed integer which has "Y" bits of
data "IO.Slot1.Input.Read_data_1_1" starting from bit position "X".

2.10 Clearing ARGEE™ Program

In some embodiments, making a "New Project" and pressing "Run" will stop any ARGEE™ project and will set the station to the state "ARGEE™ not loaded".

2.11 Reset an ARGEE™ Program (Reset all Variables to Defaults)

In some embodiments, pressing "Run" will restart the ARGEE™ program (except for retain variables). To reset retain variables, they need to be reset from the debug or HMI screen individually.

2.12 Source-Code Protection

In the main ARGEE™ environment, Navigate to "Project"→"Run Without Source" to force the upload of the binary code without the source code. This way, the end user does not have the access to the source and cannot modify the program just by loading the ARGEE™ environment. The integrator person can have a complete project exported to a separate file. When source code is not downloaded, the HMI functionality cannot be accessed.

2.13 Password Protection of Environment

If a web password is set, the user cannot access the programming environment and cannot download the new code until he or she enters the correct password. The user also cannot submit new values of variables through HMI (though the main HMI view-only screens will still be accessible). This is similar to the web-server implementation where everybody can view current values of parameters but cannot change them unless the password is entered.

2.14 Use Cases for Password/Source Code Restrictions

1) No security.

a. Anybody can make changes to the code, submit variables in HMI.

2) The developer wants only authorized personal to make changes to the program/submit variables in HMI.

a. Set password, Run WITH source code

3) The developer does not want anybody to modify the source code, does not want anybody to access the environment.

a. Set password, Run WITHOUT source code b. No HMI functionality

4) The developer wants to provide HMI functionality and yet avoid anybody modifying the source code a. Not possible in some embodiments.

2.15 Flowchart Version of the Program Editor

In order to facilitate acceptance of ARGEE™ environment and to make it easier for new people to try it, some embodiments allow one to create a simple flowchart expressing each rung of code. The idea behind it is to hide the syntax of the language using drop-down boxes and almost entirely eliminate typing by predefining all IO points and timers/counters/variables. The flowchart editor provides a few timers and counters with configurable presets; it will support a few predefined variables and user-defined constant values to check ranges of these variables or analog inputs. The programming environment can be used for simple digital logic or for simple analog control where the system compares analog inputs against certain thresholds and performs actions on digital IO as a result. In some embodiments, the programming environment is also used to handle certain exchanges with the upper-level PLC.

Figure 8:
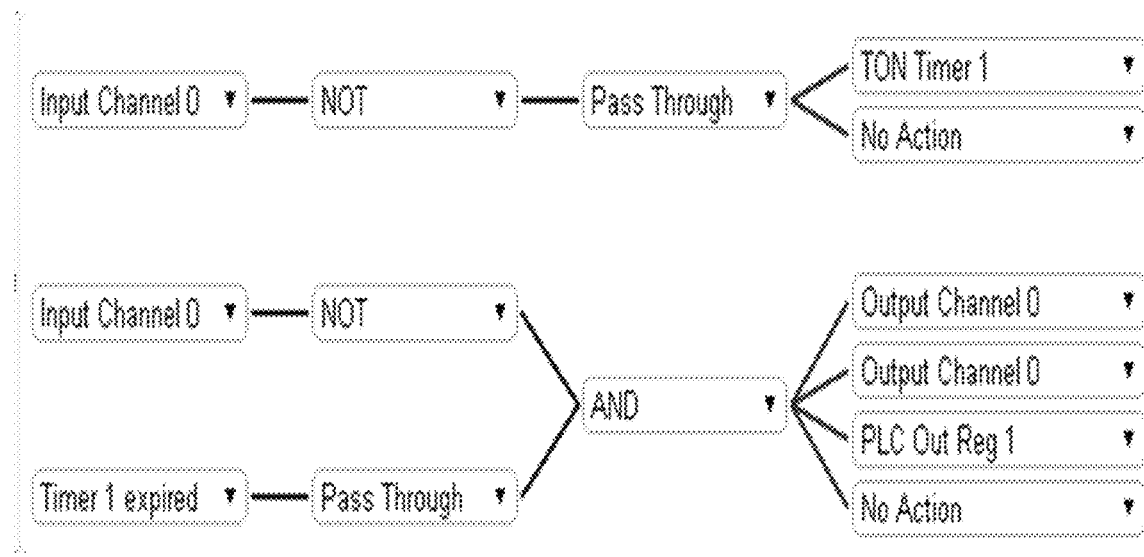
FIG. 8 is a screen shot of a flowchart 801 from a flowchart editor, according to some embodiments of the present invention.

FIG. 8 shows an example flowchart 801 that describes a simple refrigerator door monitoring application according to some embodiments of the present invention.

In some embodiments, the Flowchart code is translated into the corresponding ARGEE™ code during the compilation. The project file will specify the editor that is used and will display the code appropriately (depending weather it is using a flowchart editor or the full ARGEE™ editor).

If the program is developed in the Flowchart editor, the Flowchart view will be used in the debug screen.

Figure 9:
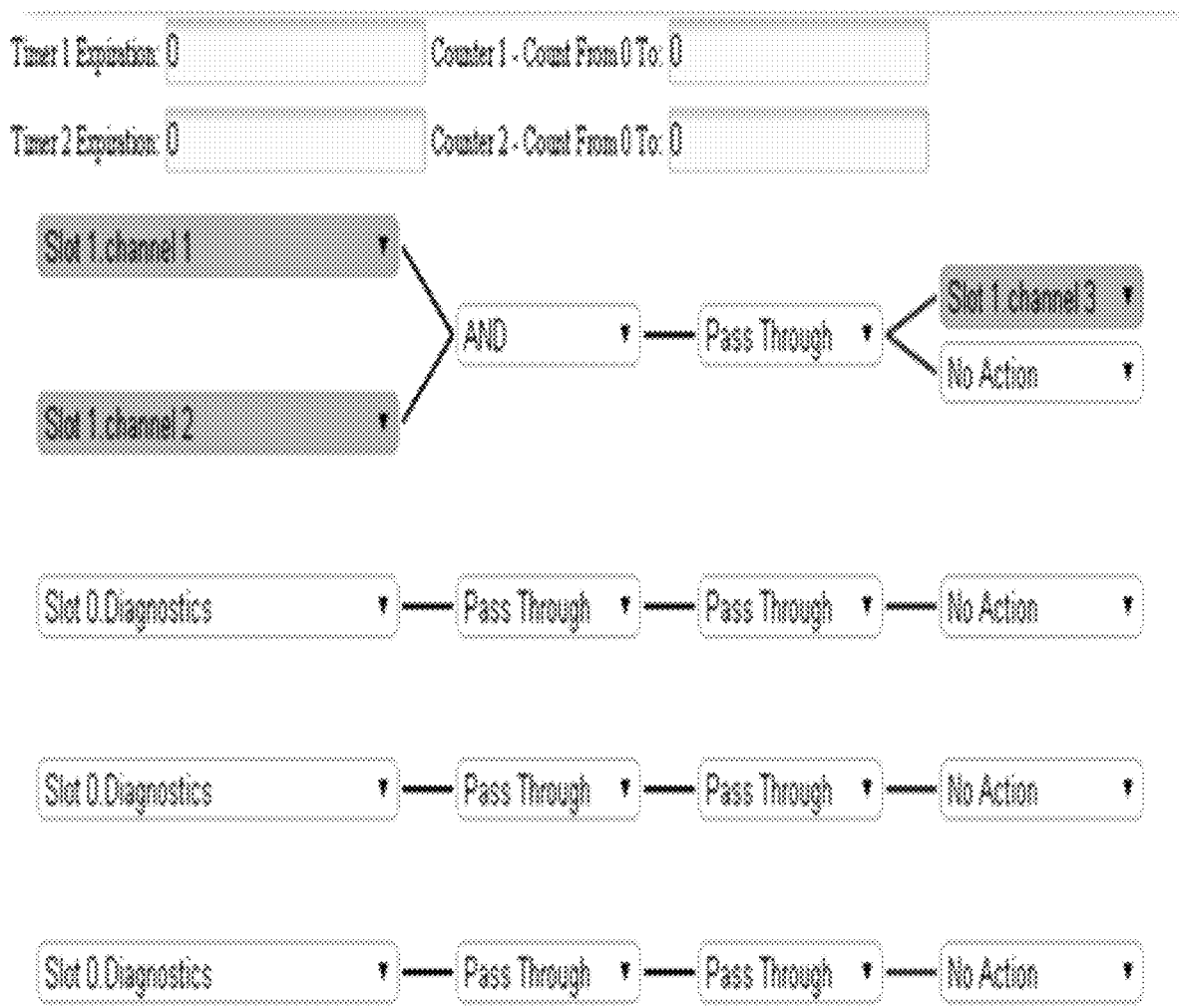
FIG. 9 is a screen shot of a flowchart editor 901, according to some embodiments of the present invention.

FIG. 9 shows one embodiment of a flowchart editor 901, according to some embodiments of the present invention.

In some embodiments, the customer can start with the flowchart environment and later on convert into the full language environment. In some embodiments, the conversion is one directional (after the customer switches to the full language, it is impossible to convert back to the flowchart environment). When "Convert to ARGEE™ program" button is pressed and confirmation dialog is shown.

2.16 Menu Items
1.1.1 Table 4 Presents Some Menu Items Used in Some Embodiments.

TABLE 4

| Level | Item | Description | Default screen |
|---|---|---|---|
| Edit Code | Project | Opens a project screen | |
| | Edit Code | Program Editor (by default starts with Flowchart and there is a button in the flowchart editor to switch to full language editor) | Default |
| | Test | Opens up debug | |
| | Run | Compiles and starts the program execution | |
| | Edit HMI | Setup HMI screens | |
| | View HMI | View HMI screens with real-time variable values | |
| | About | Version of environment Version of the ARGEE ™ kernel Link to the environment. | |
| Project | Import/ Export | Allows to save/load ARGEE ™ project files through the computer's file system (the computer where the environment is running on). | Default |
| | New Project | Erase the current project and start from scratch | |
| | Settings | Setup of the browser type. This is the first screen which is entered when the ARGEE ™ system is started for the first time on a specific machine for a specific target. | |

2.17 ARGEE™ File Format

In some embodiments, ARGEE™ project files can be uploaded/downloaded via a Web environment. The ARGEE™ file contains the following sections:
1) ARGEE™ bytecode which is executed by the VM
2) ARGEE™ program text and HMI screens
3) IO Parameter objects: Number of modules in the target module list, the target module list itself, the parameter data of all modules in the target module list.
4) Library code, descriptions (for future extension)

2.18 IO Parameters and ARGEE™

In some embodiments, since IO Parameters are part of the ARGEE™ File Format, the boot project will reload IO parameters with what is stored in the project at the startup.

2.19 Extension to GW Status Word

In some embodiments, Bit 1 (starting from 0) means: ARGEE™ Boot Project Loaded.

2.20 ARGEE™ and PLC IO Connection

ARGEE™ startup is delayed by ten seconds in order to allow an erase command to be sent in the TBEN-S stations. The PLC can detect whether the ARGEE™ application is running or not by checking the appropriate bit in the GW status word (see above).

2.21 ARGEE™ Security

In order to make it difficult or impossible for a customer or a hacker to load ARGEE™ program without any visible indication to the end user, the following actions are done:
1) If the ARGEE™ program is loaded:
   a. Regular EIP connection point combinations 101,102 or 103,104 are not allowed.
      If a connection was already established with these point combinations it is terminated.
      i. Allowed ARGEE™ connection point pair 101,110.
   b. Regular Modbus/TCP registers are not accessible. Any access will result in exception. All commands except for read/write holding registers results in exception.
      i. Only ARGEE™ MBTCP registers can be read/written to (see section 2.3 "ARGEE™ Programming Language" for details).
   c. Profinet access is disabled.
2) If ARGEE™ program is not loaded:
   a. Regular EIP connection point pairs are acceptable 101,102 or 103,104.
      i. Connection to ARGEE™ connection point pair 101, 110 is not allowed.
   b. Regular Modbus/TCP registers are accessible. All function codes are accessible. Access to ARGEE™ system specific registers results in exception.
   c. Profinet is accessible.

For a procedure on how to unload the ARGEE™ program refer to section 2.10 clearing the ARGEE™ program.

The intention of the security is to make sure that the customer is aware that a device is running a custom logic program. If a hacker loads a custom program into the device, the standard PLC connections will fail and the customer will be aware of some suspicious behavior. Since the non-ARGEE™ device cannot work without a PLC connection, it is expected that the customer is always aware whether the ARGEE™ program is loaded or not.

2.22 Distinction Between Regular Device and ARGEE™ Device

If the customer wants to use ARGEE™ device with the PLC-EDS (electronic data sheet) files should not be used and the ARGEE™ device should be loaded as a GENERIC_ETHERNET device in Rockwell environment. For the distinction between ARGEE™ connections and non-ARGEE connections refer to section 2.21.

2.23 Simulation

In some embodiments, the ARGEE™ environment provides a built in simulation for a number of devices. If the user starts "sim.html" from within the environment directory for the first time, a list of simulated devices shows up and the user can select which device he or she wants to simulate. The same list shows up if the user selects to start a new project by pressing "New Project."

In some embodiments, simulation only works in the ARGEE™ mode (not in the flowchart mode) and the simulation tries to behave as close to the real device as possible. One can create programs, debug programs, import/export projects with simulation. Simulated projects can be imported into the actual device.

In some embodiments, to simulate Inputs/Diagnostics, the user clicks on "Modify Variables" in the "Test" mode and all the Input/Diagnostics IO datapoints can be edited to provide a proper simulation.

Please note that in some embodiments, parameter data in the simulated project is blank. The real device parameters need to be set when importing simulated project and the real project needs to be re-compiled/re-exported to store correct parameter values into the program.

In some embodiments, the present invention provides a web-based programming environment that is hosted outside the embedded device it is controlling. It resides on a "hosting server". The environment is used to develop/load/debug a user program into an embedded device. Once the environment is accessed through the hosting server once, the connection to the "hosting server" is no longer required for the operation of the environment.

In some embodiments, the ARGEE™ system includes a simple programming language that runs on Ethernet block-input/output (block-IO) devices. In some embodiments, the ARGEE™ system includes of two parts: (1) a web-based programming environment (e.g., 322 of FIG. 3A and FIG. 3B) that compiles the GUI program into a bytecode program of the virtual machine; and (2) a virtual machine (e.g., VM 340 of FIG. 3A and FIG. 3B) that runs inside the device firmware and executes the bytecode program representing a program that the user created. There are large numbers of programming languages that provide a web-based programming environment. Some of these languages apply to embedded devices. However, the ARGEE™ system (e.g., system 301/302 of FIG. 3A and FIG. 3B), considered as a whole, is unique in that the programming environment is not hosted on the same embedded device it is supposed to control. The ARGEE™ system reduces the Flash requirements of the device by hosting the environment on an external hosting server. The ARGEE™ system also facilitates a faster update cycle of the environment software, making it easier to distribute changes to customers when environment changes.

In some embodiments, the present invention provides an apparatus for providing a web-based programming environment for developing, loading, and debugging a user program into an embedded device. This apparatus includes: a hosting server; a software program that resides and executes on the hosting server that is outside the embedded device that the programming environment is controlling; and a software program that resides and executes on the embedded device, wherein, once the programming environment is accessed through the hosting server a first time, the connection (e.g., 321 of FIG. 3A) to the hosting server is no longer required for the operation of the programming environment.

In some embodiments, the present invention provides a non-transitory computer-readable medium having stored thereon instructions that cause a suitably programmed computer system to perform a method, wherein the method includes: loading a programming environment software program from a hosting server into a client computer; eliciting and receiving, from a human user, graphical-user-interface (GUI) information that specifies a first GUI software program to control a programmable logic controller (PLC); compiling the first GUI software program into a bytecode program using a client computer that is outside the PLC; loading the bytecode program into the PLC from the client computer; disconnecting the hosting server from the client computer; and presenting a programming environment to the human user from the client computer while the client computer is disconnected from the hosting server.

In some embodiments, the present invention provides a computer-implemented method for providing a web-based programming environment for developing, loading, and debugging a user program into an embedded device. This method includes loading a web server program into firmware within a microprocessor used in an embedded environment; connecting the microprocessor to a client computer having a web-browser program executing thereon; eliciting and receiving by the client computer, from a human user, graphical-user-interface (GUI) information that specifies a first GUI software program to be used to control the microprocessor; compiling, in the client computer, the first GUI software program into a bytecode program using the client computer that is outside the microprocessor; loading the bytecode program into the microprocessor from the client computer; and presenting a programming environment that includes simulation features to the human user from the microprocessor via the web-browser program.

Some embodiments further include loading a simulator program into the client computer, wherein the simulator is configured to execute bytecode programs, to set variables in the microprocessor according to data elicited and received from a human user into the client computer, and to read data from the variables as if the variables were in the microprocessor and send the read data to the human user.

Some embodiments further include providing a hosting server connected to the internet; downloading a first set of software to the client computer from the hosting server, wherein the first set of software includes: a compiler suitable to execute on the client computer to generate bytecode programs that will execute in the microprocessor (or alternatively in the simulator program that is running in the client computer).

In some embodiments, the present invention provides an apparatus for providing a web-based programming environment for developing, loading, and debugging a user program into an industrial automation controller. This apparatus includes a hosting server which hosts downloadable software that, when downloaded and executed, creates the web-based programming environment in a client computer; a client PC (personal computer) with a web browser that downloads and runs the web-based programming environment from the hosting server, wherein once the web-based programming environment is loaded from the hosting server a first time, the connection to the hosting server is no longer required for the operation of the web-based programming environment; a program-compiler unit that runs in the web-based programming environment that compiles a user-specified industrial automation controller source program and that outputs a compiled bytecode program from the user-specified source program; a program loader in the web-based programming environment that loads the bytecode program into the industrial automation controller from the client computer; and a software program that resides and executes on the industrial automation controller, wherein once the programming environment software is loaded into the client computer, the connection to the hosting server and client computer is disconnected since the hosting server is no longer required for operation of the industrial automation controller. Some embodiments further include a graphical-user-interface (GUI) unit in the client computer that elicits and receives, from a human user, information that generates a GUI-displayable industrial automation controller source program. Some embodiments further include a display unit on the client computer that displays the GUI-displayable industrial automation controller source program in a "ladder logic" form with two vertical rails and a series of horizontal rungs between them, wherein the horizontal rungs are in a "Condition→Actions" format, each rung connecting from a condition on one of the two vertical rails to a corresponding action on the other vertical rail. Some embodiments further include a simulator unit in the client computer that elicits and receives, from a human user, specification information that specifies data that could be sensed by the industrial automation controller, that executes the compiled bytecode program using the specification information to obtain simulation-results data, that compares the simulation-results data against expected results data, and that outputs to the human user, results of the comparison. Some embodiments further include a simulator unit in the client computer that elicits and receives, from a human user, specification information that specifies data that could be sensed by the industrial automation controller, that executes the compiled bytecode program using the specification information to obtain simulation-results data, that compares the simulation-results data against expected results data, and that outputs to the human user, results of the comparison. Some embodiments further include a display unit on the client computer that displays the user-specified industrial automation controller source program in a "ladder logic" form with two vertical rails and a series of horizontal rungs between them, wherein the horizontal rungs are in a "Condition Actions" format. In some embodiments, the software program that resides and executes on the industrial automation controller is built-in during manufacturing. In some embodiments, the software program that resides and executes on the industrial automation controller is downloaded into the industrial automation controller from the client computer.

In some embodiments, the present invention provides a non-transitory computer-readable medium having stored thereon instructions that cause a suitably programmed computer system to perform a method. This method includes eliciting and receiving, from a human user, graphical-user-interface (GUI) information that specifies a first GUI software program to control an industrial automation controller (IAC); compiling the first GUI software program into a bytecode program using a client computer that is outside the IAC; loading the bytecode program into the IAC from the client computer; and presenting a programming environment to the human user from the client computer, wherein the programming environment running in the client computer includes a simulator that simulates the IAC executing the bytecode program. Some embodiments of the non-transitory computer-readable medium further include instructions to cause the method to further include eliciting and receiving, via a graphical-user-interface (GUI) in the client computer, information from a human user to specify a GUI-displayable industrial automation controller source program. Some embodiments of the non-transitory computer-readable medium further include instructions to cause the method to further include displaying, from the client computer, the GUI-displayable industrial automation controller source program in a text-based form with a column of conditions and at least one corresponding action for each condition. Some embodiments of the non-transitory computer-readable medium further include instructions to cause the method to further include displaying, from the client computer, the user-specified industrial automation controller source program in a "ladder logic" form with two vertical rails and a series of horizontal rungs between them, wherein the horizontal rungs are in a "Condition→Actions" format.

In some embodiments, the present invention provides a computer-implemented method for providing a web-based programming environment for developing, loading, and debugging a user program into an embedded industrial automation controller (IAC) device, wherein the method includes having firmware in the IAC wherein the firmware contains a web server program and software for executing s user bytecode program; loading a web server program into firmware within a microprocessor used in an embedded industrial-automation environment; connecting the microprocessor IAC to a client computer having a web-browser program executing thereon; eliciting and receiving by the client computer, from a human user, via a graphical-user-interface (GUI), information that specifies a first GUI software program to be used to control the microprocessor; compiling, in the client computer, the first GUI software program into a bytecode program using the client computer that is outside the microprocessor; loading the bytecode program into the IAC from the client computer; and executing the bytecode program in the microprocessor IAC. Some embodiments further include presenting a programming environment that includes simulation features to the human user from the client computer. Some embodiments further include simulating in the client computer and interacting with the human user as part of the programming environment executing through the client computer's web browser, wherein the simulator is configured to execute bytecode programs, to set variables according to data received from the GUI, and to read data from the variables and send the read data to the GUI. Some embodiments further include connecting from the client computer to a hosting server connected via the internet; downloading a first set of software to the client computer from the hosting server, wherein the first set of software includes: a compiler suitable to execute on the client computer to perform the compiling to generate a bytecode programs that will execute in the microprocessor, the simulator program, and the web-server program. Some embodiments further include displaying, from the client computer, the GUI-displayable industrial automation controller source program in a "ladder logic" form with two vertical rails and a series of horizontal rungs between them, wherein the horizontal rungs are in a "Condition→Actions" format. In some embodiments, the eliciting and receiving via the graphical-user-interface (GUI), information that specifies a first GUI software program, includes: displaying, from the client computer, a text-based form with a plurality of conditions and a corresponding plurality of actions; and receiving from the human user as specification of a particular condition and a particular action associated with that action. In some embodiments, the eliciting and receiving via the graphical-user-interface (GUI), information that specifies a first GUI software program, includes: displaying, from the client computer, a "ladder logic" form with at least one vertical rail and a series of horizontal rungs, wherein the horizontal rungs are in a "Condition→Actions" format; and receiving from the human user as specification of a particular condition and a particular action associated with that action.

In some embodiments, the present invention provides an apparatus for providing a web-based programming environment for developing, loading, and debugging a user program into an embedded device, the apparatus including: means for loading a web server program into firmware within a microprocessor used in an industrial-automation environment; means for connecting the microprocessor to a client computer having a web-browser program executing thereon; means for eliciting and receiving by the client computer, from a human user, via a graphical-user-interface (GUI), information that specifies a first GUI software program to be used to control the microprocessor; means for compiling, in the client computer, the first GUI software program into a bytecode program using the client computer that is outside the microprocessor; means for loading the bytecode program into the microprocessor from the client computer; and means for executing the bytecode program in the microprocessor. Some embodiments further include means for simulating in the client computer and interacting with the human user as part of the programming environment executing through the client computer's web browser, wherein the simulator is configured to execute bytecode programs, to set variables according to data received from the GUI, and to read data from the variables and send the read data to the GUI. Some embodiments further include means for connecting from the client computer to a hosting server via the internet; and means for downloading a first set of software to the client computer from the hosting server, wherein the first set of software includes: a compiler suitable to execute on the client computer to perform the compiling to generate a bytecode program that will execute in the microprocessor, the simulator program, and the web-server program. Some embodiments further include means for displaying, from the client computer, the GUI-displayable industrial automation controller source program in a "ladder logic" form with two vertical rails and a series of horizontal rungs between them, wherein the horizontal rungs are in a "Condition→Actions" format. In some embodiments, the means for eliciting and receiving via the graphical-user-interface (GUI), information that specifies a first GUI software program, includes: means for displaying, from the client computer, a text-based form a plurality of conditions and actions format; and means for receiving from the human user as specification of a particular condition and a particular action associated with that action.

In some embodiments, the present invention provides an apparatus for providing a web-based programming environment for developing, loading, and debugging a user program into an industrial automation controller, the apparatus including: a hosting server which hosts downloadable software that, when executed, creates the web-based programming environment; a client computer with a web browser that downloads and runs the web-based programming environment from the hosting server, wherein once the web-based programming environment is loaded from the hosting server a first time, the connection to the hosting server is no longer required for the operation of the web-based programming environment; a program-compiler unit in the web-based programming environment that compiles a user-specified industrial automation controller source program and outputs a compiled user-bytecode program from the user-specified source program; a program loader that loads the user-bytecode program into the industrial automation controller from the client computer; and a built-in software program that resides and executes on the industrial automation controller, wherein once the programming environment software is loaded into the client computer, the connection to the hosting server and client computer is disconnected since the hosting server is no longer required for operation of the industrial automation controller. Some embodiments further include a graphical-user-interface (GUI) unit in the client computer that elicits and receives, from a human user, information that generates a GUI-displayable industrial automation controller source program. Some embodiments further include a display unit on the client computer that displays the GUI-displayable industrial automation controller source program in a text-based "ladder logic" form with a column of conditions and at least one corresponding action for each condition. Some embodiments further include a simulator unit in the client computer that elicits and receives, from a human user, specification information that specifies data that could be sensed by the industrial automation controller, that executes the compiled bytecode program using the specification information to obtain simulation-results data, that compares the simulation-results data against expected results data, and that outputs to the human user, results of the comparison. Some embodiments further include a simulator unit in the client computer that elicits and receives, from a human user, specification information that specifies data that could be sensed by the industrial automation controller, that executes the compiled bytecode program using the specification information to obtain simulation-results data, that compares the simulation-results data against expected results data, and that outputs to the human user, results of the comparison. Some embodiments further include a display unit on the client computer that displays the user-specified industrial automation controller source program in a text-based form with a column of conditions and at least one corresponding action for each condition. Some other embodiments further include a display unit on the client computer that displays the user-specified industrial automation controller source program in a "ladder logic" form with two vertical rails and a series of horizontal rungs between them, wherein the horizontal rungs are in a "Condition→Actions" format.

In some embodiments, the present invention provides a non-transitory computer-readable medium having stored thereon instructions that cause a suitably programmed computer system to perform a method, the method including: eliciting and receiving, from a human user, graphical-user-interface (GUI) information that specifies a first GUI software program to control a first one of a plurality of industrial automation controllers (IACs) and GUI information that specifies a second GUI software program to control a second one of the plurality of IACs; compiling the first GUI software program into a first bytecode program using a client computer that is outside the first IAC; loading the bytecode program into the first IAC from the client computer; compiling the second GUI software program into a second bytecode program using the client computer that is outside the second IAC; loading the second bytecode program into the second IAC from the client computer; and presenting a programming environment to the human user from the client computer, wherein the programming environment running in the client computer includes a simulator that simulates the first IAC executing the first bytecode program. Some embodiments of the non-transitory computer-readable medium further include instructions to cause the method to further include controlling the plurality of IACs via browser software and handling IAC communications via individual internet-protocol (IP) addresses of each one of the plurality of IACs. Some embodiments of the non-transitory computer-readable medium further include instructions to cause the method to further include using a web-based implementation in the client computer to program the plurality of IACs, where the programming environment is a cached version of a web page located in a client computer. Some embodiments of the non-transitory computer-readable medium further include instructions to cause the method to further include simultaneously programming the plurality of IACs from the single client computer. Some embodiments of the non-transitory computer-readable medium further include instructions to cause the method to further include eliciting and receiving, via a graphical-user-interface (GUI) in the client computer, information from a human user to specify a GUI-displayable industrial automation controller source program. Some embodiments of the non-transitory computer-readable medium further include instructions to cause the method to further include displaying, from the client computer, the GUI-displayable industrial automation controller source program in text-based form with a column of conditions and at least one corresponding action for each condition. Some other embodiments of the non-transitory computer-readable medium further include instructions to cause the method to further include displaying, from the client computer, the user-specified industrial automation controller source program in a "ladder logic" form with two vertical rails and a series of horizontal rungs between them, wherein the horizontal rungs are in a "Condition→Actions" format.

In some embodiments, the present invention provides a computer-implemented method for providing a web-based programming environment for developing, loading, and debugging a user program into an embedded device, the method including: having a web server program in firmware within a microprocessor used in an industrial-automation environment; connecting the microprocessor to a client computer having a web-browser program executing thereon; eliciting and receiving by the client computer, from a human user, via a graphical-user-interface (GUI), information that specifies a first GUI software program and a second GUI software program to be used to control the first and second microprocessors, respectfully; compiling, in the client computer, the first GUI software program into a first bytecode program using the client computer; compiling, in the client computer, the first GUI software program into a first bytecode program using the client computer; loading the first bytecode program into the first microprocessor from the client computer; loading the second bytecode program into the second microprocessor from the client computer; executing the first bytecode program in the first microprocessor; and executing the first bytecode program in the first microprocessor. Some such embodiments further include loading web-browser software from a hosting server into the client computer, wherein the web-browser software controls the limitations in the method. Some embodiments further include simulating in the client computer and interacting with the human user as part of the programming environment executing through the client computer's web browser, wherein the simulator is configured to execute bytecode programs, to set variables according to data received from the GUI, and to read data from the variables and send the read data to the GUI. Some embodiments further include connecting from the client computer to a hosting server via the internet; downloading a first set of software to the client computer from the hosting server, wherein the first set of software includes: a compiler suitable to execute on the client computer to perform the compiling to generate a bytecode program that will execute in the microprocessor, the simulator program, and the web-server program. Some embodiments further include displaying, from the client computer, the GUI-displayable industrial automation controller source program in a "ladder logic" form with two vertical rails and a series of horizontal rungs between them, wherein the horizontal rungs are in a "Condition→Actions" format. In some embodiments, the eliciting and receiving via the graphical-user-interface (GUI), information that specifies a first GUI software program, includes: displaying, from the client computer, a "ladder logic" form with two vertical rails and a series of horizontal rungs between them, wherein the horizontal rungs are in a "Condition→Actions" format; and receiving from the human user as specification of a particular condition and a particular action associated with that action.

In some embodiments, the present invention provides an apparatus for providing a web-based programming environment for developing, loading, and debugging a user program into an embedded device, the apparatus including: means for loading a web server program into firmware within a microprocessor used in an industrial-automation environment; means for connecting the microprocessor to a client computer having a web-browser program executing thereon; means for eliciting and receiving by the client computer, from a human user, via a graphical-user-interface (GUI), information that specifies a first GUI software program to be used to control the microprocessor; means for compiling, in the client computer, the first GUI software program into a bytecode program using the client computer that is outside the microprocessor; means for loading the bytecode program into the microprocessor from the client computer; and means for executing the bytecode program in the microprocessor. Some embodiments further include means for simulating in the client computer and interacting with the human user as part of the programming environment executing through the client computer's web browser, wherein the simulator is configured to execute bytecode programs, to set variables according to data received from the GUI, and to read data from the variables and send the read data to the GUI. Some embodiments further include means for connecting from the client computer to a hosting server via the internet; means for downloading a first set of software to the client computer from the hosting server, wherein the first set of software includes: a compiler suitable to execute on the client computer to perform the compiling to generate a bytecode program that will execute in the microprocessor, the simulator program, and the web-server program. Some embodiments further include means for displaying, from the client computer, the GUI-displayable industrial automation controller source program in a text-based form with a column of conditions and at least one corresponding action for each condition. In some embodiments, the means for eliciting and receiving via the graphical-user-interface (GUI), information that specifies a first GUI software program, includes: means for displaying, from the client computer, a text-based form with a column of conditions and at least one corresponding action for each condition; and means for receiving from the human user as specification of a particular condition and a particular action associated with that action.

In some embodiments, the technical problems solved by the present invention include facilitating programming of, loading program code into, and debugging an industrial automation controller (which can be implemented using a programmable logic controller or other suitable architecture), while permitting a downsizing of the on-device flash memory, or other non-volatile type of memory (the memory that holds the control-program software) of the industrial automation controller. The technical solution allows a human user to develop programs on a web-based client computer that is connected to a plurality of embedded or industrial-automation controllers ("IACs"), each at a location relatively remote from the human user at the web-based computer, and each of the plurality of controllers needing a different type or version of code programs, then download the various programs to the various controllers and simulate/debug the code in the plurality of controllers under the control and observation of the human user at the web-based computer. In addition, some embodiments include a central server that downloads the software programming environment (SWPE) into the client computer. The SWPE is web-browser-based such that it is independent of operating system and does not require installation of software; rather the SWPE runs in the browser of whatever type of computer is used for the client computer. Because most of the functionality is in the implemented in the client computer, in some embodiments the size of the flash or other type of non-volatile memory in the IACs can be minimized. In some embodiments, the size of the FLASH memory, electrically erasable programmable read-only memory (EEPROM) or other non-volatile memory is 1 kilobyte (kB) or less, in other embodiments, 8 kB or less, in further embodiments, 16 kB. In further embodiments the size of the FLASH memory, electrically erasable programmable read-only memory (EROM) or other non-volatile memory will be 64 kB or less, in additional embodiments, 128 kB or less, in yet further embodiments, 256 kB or less, in yet further embodiments, 512 kB or less, and in yet further embodiments, one megabyte (MB) or less.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus for providing a web-based software programming environment for facilitating programming, loading, and debugging a user program into industrial automation controllers that each have a limited amount of program memory, and that each have a web server program that resides and executes on each industrial automation controller, the apparatus comprising:
    a client computer with a web browser that runs a web-based programming environment, wherein the client computer includes the web-based software programming environment, a client computer file system and supports a plurality of browser windows;
    a program-compiler unit in the web-based programming environment in the client computer that compiles a user-specified industrial automation controller source program and outputs a compiled user-bytecode program based on the user-specified source program;
    an import/export unit in the web-based programming environment that saves and loads project files using the client computer file system; and
    a program loader unit in the web-based programming environment that loads, using a first browser window running on the client computer, a first respective one of a plurality of industrial automation controllers with a first respective one of the user-bytecode programs into the plurality of industrial automation controllers from a first one of a plurality of different storage sections within localStorage provided by HTML5 in the client computer and that loads, using a second browser window also running on the client computer, a second respective one of the plurality of industrial automation controllers with a second respective one of the user-bytecode programs from a second one of the plurality of different storage sections within localStorage provided by HTML5 in the client computer, wherein the client computer controls the plurality of industrial automation controllers during execution of the loaded user-bytecode programs by the plurality of industrial automation controllers, each via a different one of the plurality of browser windows on the client computer.

2. The apparatus of claim 1, wherein the plurality of industrial automation controllers includes a first programmable logic controller (PLC) and a second upper-level PLC, and wherein the first PLC communicates data to the second upper-level PLC.

3. The apparatus of claim 1, wherein the web-based programming environment is created by downloadable software that, when executed, creates the web-based programming environment, and wherein the client computer downloads and runs the downloadable software from a hosting server, and wherein once the downloadable software is loaded into the client computer, the connection to the hosting server and client computer is disconnected since the hosting server is no longer required for operation of the industrial automation controller.

4. The apparatus of claim 1, further comprising:
    a graphical-user-interface (GUI) unit in the client computer that elicits and receives, from a human user, information that generates a GUI-displayable industrial automation controller source program; and
    a display unit on the client computer that displays the GUI-displayable industrial automation controller source program in a text-based "ladder logic" form with a column of conditions and at least one corresponding action for each condition.

5. The apparatus of claim 4, further comprising:
    a simulator unit in the client computer that elicits and receives, from a human user, specification information that specifies data that could be sensed by the industrial automation controller, that executes the compiled bytecode program using the specification information to obtain simulation-results data, that compares the simulation-results data against expected results data, and that outputs to the human user, results of the comparison.

6. The apparatus of claim 1, further comprising:
    a simulator unit in the client computer that elicits and receives, from a human user, specification information that specifies data that could be sensed by the industrial automation controller, that executes the compiled bytecode program using the specification information to obtain simulation-results data, that compares the simulation-results data against expected results data, and that outputs to the human user, results of the comparison.

7. The apparatus of claim 1, further comprising:
    a display unit on the client computer that displays the user-specified industrial automation controller source program in a "ladder logic" form with two vertical rails and a series of horizontal rungs between them, wherein the horizontal rungs are in a "Condition→Actions" format.

8. The apparatus of claim 1, wherein the web server program that resides and executes on the industrial automation controller is built-in during manufacturing.

9. The apparatus of claim 1, wherein the web server program that resides and executes on the industrial automation controller is downloaded into the industrial automation controller from the client computer.

10. A non-transitory computer-readable medium having stored thereon instructions that cause a suitably programmed computer system to perform a method for facilitating programming, loading, and debugging a user program into industrial automation controllers that each have a limited amount of memory, and that each have a web server program that resides and executes on each on the industrial automation controller, the method comprising:
    loading a web-based programming environment into a client computer that includes a client computer file system, and from the web-based programming environment, performing the following:
        eliciting and receiving, from a human user, graphical-user-interface (GUI) information that specifies a first GUI software program to control a first one of a plurality of industrial automation controllers (IACs) and GUI information that specifies a second GUI software program to control a second one of the plurality of IACs;
        compiling the first GUI software program into a first bytecode program using a client computer that is outside the first IAC;
        using a first browser window running in the client computer, loading the bytecode program into the first IAC from a first one of a plurality of different storage sections within localStorage provided by HTML5 in the client computer;
        compiling the second GUI software program into a second bytecode program using the client computer that is outside the second IAC;
        using a second browser window running in the client computer, loading the second bytecode program into the second IAC from a second one of the plurality of different storage sections in the client computer; and
        presenting a web based programming environment to the human user from the client computer, wherein the programming environment running in the client computer supports a plurality browser windows each controlling a different one of the plurality of IACs during execution of the respective loaded bytecode program by the respective IAC including a first browser window controlling the first IAC and a second browser window controlling the second IAC.

11. The non-transitory computer-readable medium of claim 10, further comprising instructions to cause the method to further include controlling the plurality of IACs via browser software and handling IAC communications via individual internet-protocol (IP) addresses of each one of the plurality of IACs.

12. The non-transitory computer-readable medium of claim 10, further comprising instructions to cause the method to further include using a web-based implementation in the client computer to program the plurality of IACs, where the programming environment is a cached version of a web page located in a client computer.

13. The non-transitory computer-readable medium of claim 10, further comprising instructions to cause the method to further include simultaneously programming the plurality of IACs from the single client computer.

14. The non-transitory computer-readable medium of claim 10, further comprising instructions to cause the method to further include:
    eliciting and receiving, via a graphical-user-interface (GUI) in the client computer, information from a human user to specify a GUI-displayable industrial automation controller source program.

15. The non-transitory computer-readable medium of claim 14, further comprising instructions to cause the method to further include:
    displaying, from the client computer, the GUI-displayable industrial automation controller source program in text-based form with a column of conditions and at least one corresponding action for each condition.

16. The non-transitory computer-readable medium of claim 10, further comprising instructions to cause the method to further include:
    displaying, from the client computer, the user-specified industrial automation controller source program in a "ladder logic" form with two vertical rails and a series of horizontal rungs between them, wherein the horizontal rungs are in a "Condition 4 Actions" format.

17. A computer-implemented method for providing a web-based programming environment for facilitating programming, loading, and debugging user programs into a plurality of embedded devices that each have a limited amount of on-device memory, the method comprising:
    having a web server program in firmware within a plurality of microprocessors including first and second microprocessors used in an industrial-automation environment;
    connecting each one of the plurality of microprocessors to a client computer having a web-browser program executing thereon; wherein the web-browser program includes an import/export unit that performs saving project files using a local file system in the client computer;
    eliciting and receiving by the client computer, from a human user, via a graphical-user-interface (GUI), information that specifies a first GUI software program and a second GUI software program to be used to control the first and second microprocessors, respectfully;
    compiling, in the client computer, the first GUI software program into a first bytecode program using the client computer;
    compiling, in the client computer, the second GUI software program into a second bytecode program using the client computer;
    using a first browser window running in the client computer, loading the first bytecode program into the first microprocessor from a first one of a plurality of different storage sections within localStorage provided by HTML5 in the client computer;
    using a second browser window running in the client computer, loading the second bytecode program into the second microprocessor from a second one of the plurality of different storage sections in the client computer;
    executing the first bytecode program in the first microprocessor;
    executing the second bytecode program in the second microprocessor;
    controlling the plurality of microprocessors, each via a different one of the plurality of browser windows on the client computer during execution of the respective loaded bytecode program by the respective microprocessors including a first browser window controlling the first microprocessor and a second browser window controlling the second microprocessor.

18. The computer-implemented method of claim 17, further comprising:
simulating in the client computer and interacting with the human user as part of the programming environment executing through the client computer's web browser, wherein the simulator is configured to execute bytecode programs, to set variables according to data received from the GUI, and to read data from the variables and send the read data to the GUI.

19. The computer-implemented method of claim 18, further comprising:
connecting from the client computer to a hosting server via the internet;
downloading a first set of software to the client computer from the hosting server, wherein the first set of software includes:
  a compiler suitable to execute on the client computer to perform the compiling to generate a bytecode program that will execute in the microprocessor,
  the simulator program, and
  the web-server program.

20. The computer-implemented method of claim 17, further comprising:
displaying, from the client computer, the GUI-displayable industrial automation controller source program in a "ladder logic" form with two vertical rails and a series of horizontal rungs between them, wherein the horizontal rungs are in a "Condition Actions" format.

21. The computer-implemented method of claim 17, wherein the eliciting and receiving via the graphical-user-interface (GUI), information that specifies a first GUI software program, includes:
displaying, from the client computer, a "ladder logic" form with two vertical rails and a series of horizontal rungs between them, wherein the horizontal rungs are in a "Condition→Actions" format; and
receiving from the human user as specification of a particular condition and a particular action associated with that action.

22. An apparatus for providing a web-based programming environment for developing, loading, and debugging a user program into a plurality of embedded devices including a first embedded device and a second embedded device both used in an industrial-automation environment, each one of the plurality of embedded devices having a limited amount of on-device memory and a web server program in firmware within each one of the plurality of embedded devices, the apparatus comprising:
means for connecting each one of the plurality of embedded devices to a client computer having a web-browser program executing thereon; wherein the web-browser program includes an import/export unit that performs saving project files using a local file system in the client computer;
means for eliciting and receiving by the client computer, from a human user, via a graphical-user-interface (GUI), information that specifies a first GUI software program and a second GUI software program to be used to control the first and second embedded devices, respectfully;

means for compiling, in the client computer, the first GUI software program into a first bytecode program using the client computer;
means for compiling, in the client computer, the second GUI software program into a second bytecode program using the client computer;
means for using a first browser window running in the client computer to load the first bytecode program into the first embedded device from a first one of a plurality of different storage sections within localStorage provided by HTML5 in the client computer;
means for using a second browser window running in the client computer to load the second bytecode program into the second embedded device from a second one of the plurality of different storage sections in the client computer; and
means for controlling the plurality of embedded devices, each via a different one of the plurality of browser windows on the client computer during execution of the respective loaded bytecode program by the respective embedded device including a first browser window controlling the first embedded device and a second browser window controlling the second embedded device.

23. The apparatus of claim 22, further comprising:
means for simulating in the client computer and interacting with the human user as part of the programming environment executing through the client computer's web browser, wherein the simulator is configured to execute bytecode programs, to set variables according to data received from the GUI, and to read data from the variables and send the read data to the GUI.

24. The apparatus of claim 22, further comprising:
means for connecting from the client computer to a hosting server via the internet;
means for downloading a first set of software to the client computer from the hosting server, wherein the first set of software includes:
  a compiler suitable to execute on the client computer to perform the compiling to generate a bytecode program that will execute in the microprocessor,
  the simulator program, and
  the web-server program.

25. The apparatus of claim 22, further comprising:
means for displaying, from the client computer, the GUI-displayable industrial automation controller source program in a text-based form with a column of conditions and at least one corresponding action for each condition.

26. The apparatus of claim 22, wherein the means for eliciting and receiving via the graphical-user-interface (GUI), information that specifies a first GUI software program, includes:
means for displaying, from the client computer, a text-based form with a column of conditions and at least one corresponding action for each condition; and
means for receiving from the human user as specification of a particular condition and a particular action associated with that action.

* * * * *